(12) United States Patent  
Kramer

(10) Patent No.: US 8,544,797 B2  
(45) Date of Patent: Oct. 1, 2013

(54) CARGO CARRYING AIR VEHICLE

(76) Inventor: Dale Clifford Kramer, Hammondsport, NY (US)

( * ) Notice: Subject to any disclaimer, the term of this patent is extended or adjusted under 35 U.S.C. 154(b) by 370 days.

(21) Appl. No.: 13/075,155

(22) Filed: Mar. 29, 2011

(65) Prior Publication Data

US 2011/0233325 A1    Sep. 29, 2011

Related U.S. Application Data

(60) Provisional application No. 61/318,781, filed on Mar. 29, 2010.

(51) Int. Cl.
*B64B 1/58* (2006.01)
(52) U.S. Cl.
USPC .............................. 244/128; 244/30; 244/125
(58) Field of Classification Search
USPC ............................................ 244/128, 30, 125
See application file for complete search history.

(56) References Cited

U.S. PATENT DOCUMENTS

| | | | | |
|---|---|---|---|---|
| 1,860,555 A * | 5/1932 | Schlosser | ...................... | 244/128 |
| 4,773,617 A * | 9/1988 | McCampbell | .................. | 244/24 |
| 5,713,536 A * | 2/1998 | Bata | ................................ | 244/96 |
| 5,992,795 A * | 11/1999 | Tockert | ........................... | 244/31 |
| 6,427,943 B2 * | 8/2002 | Yokomaku et al. | ............. | 244/30 |
| 7,487,936 B2 * | 2/2009 | Heaven, Jr. | ..................... | 244/30 |
| 7,552,893 B2 * | 6/2009 | Colting | ........................... | 244/30 |
| 8,191,819 B2 * | 6/2012 | Luchsinger | ..................... | 244/30 |
| 8,286,910 B2 * | 10/2012 | Alavi | .............................. | 244/30 |
| 2005/0224638 A1 * | 10/2005 | Goodey | ........................... | 244/30 |
| 2006/0065777 A1 * | 3/2006 | Walden et al. | .................. | 244/97 |

* cited by examiner

*Primary Examiner* — Christopher P Ellis
(74) *Attorney, Agent, or Firm* — Oakwood Law Group, LLP

(57) ABSTRACT

A system for controlling the lift of an airship for carrying a cargo and a supply of fuel has a self supporting hull made of a flexible gas impermeable material. Air which is located in the hull is at an internal pressure which is greater than the atmospheric pressure of the air on the outside of the hull, and a bag filled with helium is located within the hull and is surrounded by the air in the hull. A heating means is provided to heat both the air and the helium. The bag located within the hull and surrounded by the air in the hull has enough helium in it at ambient temperature to lift all but the cargo and fuel in the airship, and the air and helium, when heated, provides increased buoyancy due to the increase of expansion of both heated gases to lift the airship with its fuel and cargo.

19 Claims, 25 Drawing Sheets

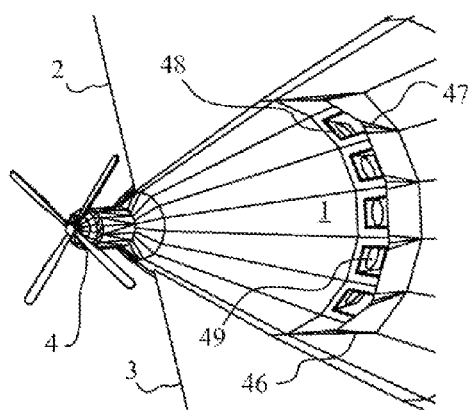
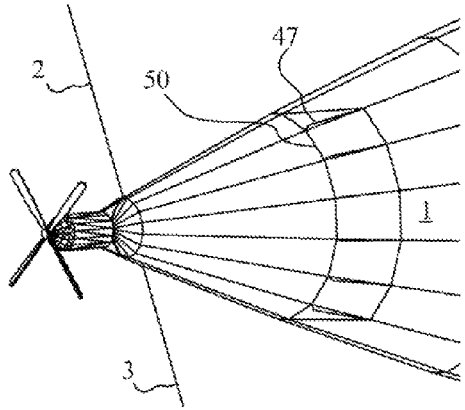
Figure 28          Figure 29
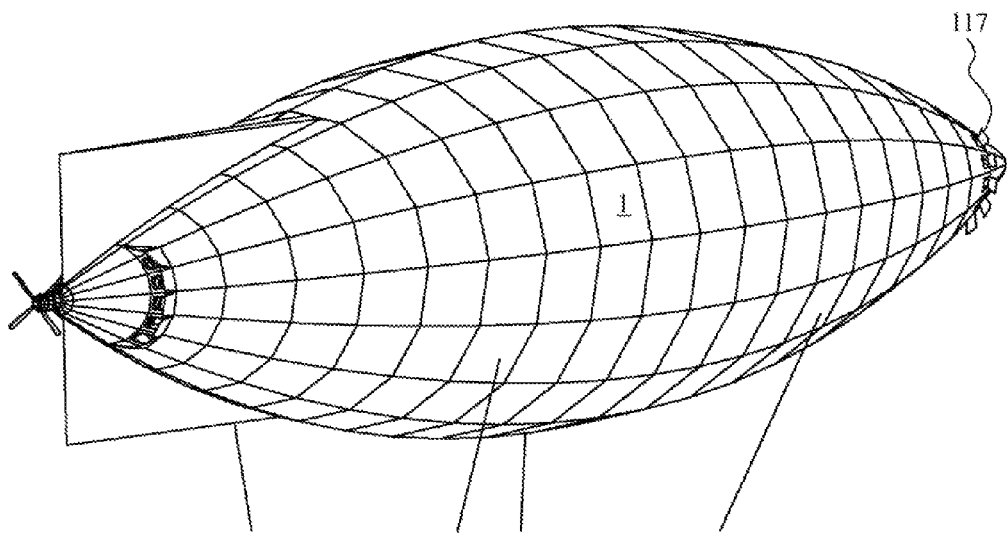
Figure 30

CARGO CARRYING AIR VEHICLE

REFERENCE TO RELATED APPLICATIONS

This patent application claims the benefit of U.S. Provisional Application No. 61/318,781 filed on Mar. 29, 2010, the disclosure of which is incorporated herein by reference in its entirety.

BACKGROUND OF THE INVENTION

1. Field of the Invention

The present invention relates generally to an airship and more specifically to a system for actively controlling the lift of an airship. Lift is accomplished by a first gas such as air which is located in the airship at an internal pressure which is greater than the atmospheric pressure of the air on the outside of the airship and a bag filled with helium which is located within the airship and is surrounded by the first gas. The bag located within the airship and surrounded by the first gas has enough helium in it at ambient temperature to lift all but the cargo and fuel in the airship. When the first gas and helium are both heated by a heating means in the airship, increased buoyancy due to the increase of expansion of both heated gases will lift the airship with its fuel and cargo.

2. Description of Related Art

Airships are known in the prior art. More specifically, by way of example, U.S. PreGrant Publication No. 2007/0102571 to Colting discloses an airship for lifting heavy and/or oversized loads. The airship uses the leverage of positive buoyancy to lift and transport payloads.

U.S. PreGrant Publication No. 2005/0211845 to Perry; et al. discloses a non-rigid or semi-rigid airship with a hull having a plurality of lobes formed therein. The lobes decrease the radius of curvature of the hull, thereby reducing the stress on the hull due to the pressurized lifting gas contained therein. The reduced stress allows the hull to be constructed from a lighter weight material, thus reducing the mass of the hull, and enabling the airship to carry more cargo. Flexible membranes are used to partially delineate lobes. The membranes are attached to the inner surface of the hull and a group of load lines connected to and running between the membranes form a polygon-shaped cross-sectional area.

U.S. Pat. No. 7,866,601 to Balaskovic discloses an airship shaped as an oblate spheroid and a support structure which forms a partial support for the hull. A horizontal stabilizing member is coupled to a lower surface of the airship, and a vertical stabilizing member having a first end is pivotally coupled to the airship. The vertical stabilizing member and the horizontal stabilizing member may be operably coupled to one another.

U.S. Pat. No. 7,156,342 to Heaven, Jr., et al. discloses a system for actively controlling the aerostatic lift of an airship by manipulating the ratio of air to lifting gas contained within the airship, and thus the overall mass of the airship. This manipulation is accomplished by actively compressing and/or decompressing the lifting gas or internal air, with the resulting pressure differential borne primarily by the hull and/or an internal pressure tank.

U.S. Pat. No. 6,837,458 to Swearingen, et al. discloses an airship having a hull which includes a first section having a width which varies along the selected direction of travel where the width increases from the bow of the hull to a maximum width and then decreases from the maximum width to the tail section of the first section; and a second section coupled to the first section and having a width which varies along the selected direction of travel where the width increases from a leading edge of the second section to a maximum width and decreases from the maximum width to the stern of the hull.

U.S. Pat. No. 6,793,180 to Nachbar, et al. discloses an airship hull having a plurality of flexible members disposed lengthwise about the perimeter of the airship skin. The flexible members can be held in place in sleeves on the skin of the airship where there ends are drawn toward one another by tensioning means which cause the members to bow outwardly from a central axis to provide a rigid structure for the skin.

U.S. Pat. No. 6,293,493 to Eichstedt, et al. discloses a non-ridged semi-buoyant vehicle with a pressure stabilized gasbag which has an aerodynamic shape. The gasbag includes vertical catenary curtains, a pair of first and second Y shaped catenary curtains which are coupled to the vertical catenary curtains and extend along a second portion of the gasbag and the arms of each of the Y shaped curtains are attached to the top surface and the legs are attached to the bottom surface of the gasbag.

U.S. Pat. No. 5,890,676 to Coleman, et al. discloses a neutral buoyancy fuel bladder which uses hydrogen and oxygen to power an airship. The neutral buoyancy fuel bladder includes a fuel cell, electrolyzer, and means for storing hydrogen, oxygen and water. The fuel cell uses the hydrogen and oxygen to create heat, water and current flow. An energy source transmits a beam to an energy receiving unit on the airship, and the energy from said beam is used to power said airship, and replenish the supply of hydrogen and oxygen.

U.S. Pat. No. 4,591,112 to Piasecki, et al. discloses an airship with provisions for vectored thrust provided by a plurality of controllable pitch rotor thrust producing units attached to the hull. The control systems are interconnected to be operable by a master control which establishes both similar and differential pitch settings of the rotors of selected thrust units in a manner to establish vectored thrust in directions which establish the required amounts of vertical lift, propulsion thrust, trim and control forces to control all flight aspects of the airship.

U.S. Pat. No. 4,326,681 to Eshoo discloses a lighter-than-air disc-shaped non-rigid airship having a flexible envelope within which an annular pressurized tube is positioned to maintain the flexible envelope in a saucer shape when inflated. A gondola is suspended beneath the central chamber. To maintain level horizontal flight stability, differential forces are developed by providing the central chamber with heated air and the outer chambers with a lighter-than-air gas such as helium to provide greater lift than the central chamber. Propulsion units are arranged at opposite side edges of the envelope and maneuvering is accomplished by rotating the airship.

Air vehicles that use gas that is lighter than air as a form of buoyancy control have been successfully flown for over 200 years. Common gasses utilized are helium, hot air and hydrogen. In recent years there have been many attempts to design a practical cargo carrying air vehicle that uses buoyant gas to aid in lifting the vehicle and cargo. There has been little or no success in these attempts.

The main feature required for a successful cargo carrying air vehicle that uses buoyant gas is that it needs to have the ability to vary its buoyancy in order to pick up and drop off cargo and to reduce its buoyancy as fuel is burned off.

Most applications for buoyant cargo carrying air vehicles require that the cargo be dropped off at its destination and that the vehicle then return home without any cargo. This requires that the air vehicle have the ability to vary its buoyancy by at least the amount of the cargo weight.

It has proven impractical in most cases to replace the cargo with disposable ballast like water for the return trip. Large quantities of water are not always available at the destination.

There is a solution for the fuel burn-off buoyancy problem but it involves using complicated exhaust condensation devices or nonstandard fuels such as blau gas.

Recent attempts to solve this buoyancy problem have included using helicopter like rotor lift to carry the payload and fuel, using aerodynamic lift that is generated by forward motion and helium recompression.

Rotor lift buoyancy control consumes fuel at a very high rate and is not practical for long distance use.

Using aerodynamic lift from forward motion negates one of the main advantages of buoyant gas vehicles which is the ability to take off and land vertically. Also, the aspect ratio of any wing type surface will be so low that this will again require tremendous amounts of fuel to achieve the necessary lift.

Helium recompression equipment is very heavy and the process is too slow to be practical.

Pressurized and powered hot air vehicles, like hot air balloons, have recently been developed. Size and significant fuel burn has limited their success. Very large envelopes are required as hot air lifts only about 20 to 25% of what the same volume of helium lifts. Also, these large envelopes radiate a lot of heat so that fuel burn is great.

My air vehicle design overcomes the buoyancy problem completely and efficiently.

The other problem area for buoyant air vehicles is dealing with size. Any air vehicle that uses a buoyant gas to aid in lifting payload must, by their very nature, be very large. Large vehicles are difficult to deal with when a wind storm arrives.

If hot air is the buoyancy source, you can release the hot air, fold up the envelope and seek shelter from the storm. This is not practical for a large commercial cargo carrying vehicle.

If helium or hydrogen is the lifting gas, it is too expensive and impractical to either re-pressurize the gas into high pressure containers or to vent the gas off into the atmosphere. Even if the gas were removed, there would still be a lot of envelope lying on the ground that must be secured.

The only solutions found to date to secure an airship during inclement weather are to store it in a hangar or to secure the nose of the airship to a mooring mast in an area large enough to let the airship weathervane in all directions Large airship hangars are very expensive and prove impractical for that reason. A mooring mast is also expensive and they must be large, permanent structures for large airships.

Mooring masts do not provide the required level of protection for an airship. Many airships have been destroyed while on mooring masts in less than extreme weather. Mooring mast damage can come from many sources. Gondola damage occurs when vertical wind gusts raise and lower the airship. There have been cases where airships were raised vertically above the mast before they were forcibly returned to the ground. Airship envelopes have been torn apart by the stresses on their single point nose attachment to the mooring mast.

My air vehicle design overcomes the mooring problem and can be moored from a single point on the ground in winds exceeding 100 mph.

Another problem area for non-rigid airships is the need to make the nose of the airship less prone to implosion as a result of dynamic air pressure when moving at high airspeeds. The problem is generally addressed with nose battens which are heavy and difficult to deal with.

My air vehicle design addresses this problem in a way that will allow my design to fly faster than normal non-rigid airships.

SUMMARY OF THE INVENTION

My design for a cargo carrying air vehicle includes an outer insulated pressurized air envelope made out of flexible material with a limp internal helium filled bag. This internal bag has enough helium in it at ambient temperature to lift all of the structure but not the fuel or cargo. This is the reverse of a normal airship design where the outer envelope holds the helium and then the pressurized helium envelope contains air ballonets inside it.

In my design, the limp helium bag is large enough to allow the helium to expand to 1.5 to 3 or more times its ambient volume before it reaches a pressurized state where helium must be vented from it to preserve its integrity. This number depends on the size and purpose of the vehicle being designed. The helium and/or air inside this outer insulated envelope is directly heated with a furnace to a maximum operating temperature, in the neighborhood of 300 degrees Fahrenheit. This heated air and helium will pick up the fuel and cargo due to the increased buoyancy of both hot expanded gasses. Then with normal airship thrusters the air vehicle will transport the cargo at a very low cost. Because of the ratio of allowed helium expansion before venting, this design can attain altitudes of over 25,000 feet which was not achievable with cargo carrying airships of the past.

The main envelope is pressurized with air to a normal non-rigid airship pressure. The shape of this envelope is a generally typical streamlined airship shape. This envelope has to be designed to prevent air and heat from leaking through it. The easiest way to prevent heat from leaking out will be as simple as affixing ordinary un-faced fiberglass house insulation or other material to the inside of the main envelope.

Depending on specific size and design of the vehicle, the helium quantity in the helium bag may be from about 20% to 40% of the volume of the main envelope. In normal operation this helium bag will never contain any significant pressure and this reduces its weight and cost.

The helium membrane needs only to be capable of holding helium, to transfer heat efficiently and withstand temperatures of approximately 300 degrees Fahrenheit. These requirements are achieved with the same material, a vacuum deposited aluminum on a flexible and thin high temperature substrate. One likely substrate material is a high melt temperature nylon.

The envelope furnace heats the inner air and/or the helium directly to a normal operating temperature of approximately 250 to 300 degrees Fahrenheit or higher.

A gondola and/or separate cargo carrier is hung below the main envelope on long cables/ropes. These long cables are necessary to maintain pendulum stability of the air vehicle. The air vehicle is designed to always fly at a level attitude. Going up or down is achieved by add or removing heat from the envelope, not by raising or lowering the nose as an aircraft or blimp does.

These long cables also provide the solution to the airship mooring problem. The gondola can be moored tightly to the ground by a single point and the envelope will weathervane above it at a high altitude. Since the helium is always lifting at least the weight of the whole structure, the gondola cables will always have as much tension as the weight of the gondola. This tension will keep the weather vaning envelope high overhead in winds up to about 70 or 80 mph. In winds higher than about 80 mph, heat is added to the envelope to put more tension on the gondola cables. This forces the envelope to ride higher in the air to a more stable position. Winds above 70 or 80 mph are generally never sustained very long and therefore minimal fuel would be required to stabilize the vehicle until the storm subsides.

The method that I use to prevent envelope nose implosion at high speeds is to use what I refer to as ball-cones. These pressurized, air filled nose envelopes whose air pressure is many times that of the main envelope, form a more pointed and much stiffer nose and tail structure for the air vehicle.

Propulsion of the vehicle will be provided by thrusters on the envelope and/or gondola/cargo carrier. Yaw control of the vehicle can be provided by movable rudder surfaces or by angling the thrust line of the propulsion motors. Precise control for hovering situations can be by any number of reversible and/or gimbaled thrusters attached to the vehicle.

Vertical fins may be necessary to provide stability about the yaw axis.

Reserve fuel may be kept on board for the amount of reserve time desired. Reserve fuel will be lifted by the ambient helium volume. This means that if it gets used on a flight, helium may need to be vented in order to land.

My design becomes competitive with C130 cargo aircraft in depreciated dollars per ton per mile costs at approximately 380 feet in length.

My 380 foot design will carry about 9,000 lbs of cargo 500 miles on about 470 gallons of fuel.

My design's combination of using hot helium and hot air with virtually unrestricted helium expansion is actually a very efficient way to lift cargo weight. A normal cargo aircraft uses 30% to 40% of its fuel to lift its structure, fuel and cargo. My high speed large designs use as little as 5% of their total fuel to carry the structure, fuel and cargo. My slower smaller designs use up to 30%.

My 800 foot design, the size of the Hindenburg, will compete directly with the largest transport aircraft, the C5 Galaxy, in terms of depreciated dollars per ton per mile costs.

My 1100 foot to 1500 designs will satisfy the proposed $21^{st}$ century Global Range Aircraft request of the US military. That is that they can deliver 150 tons of cargo 12,000 nautical miles and then return home without cargo and without refueling.

To be clear on the operation of my air vehicle, this is a typical flight profile of Version 2 of my design as depicted in FIG. 31

The pilot arrives at the vehicle mooring location and begins her routine. As she approaches the vehicle she hears the sound of one of the on board generators running. This is good because she knows it is likely that the cargo carrier's air filled structure and vehicle's 1,075 foot long envelope, way up in the sky, will likely be at their operating air pressure which must be maintained 24 hours a day.

When she arrives in the cockpit, she confirms that all the pressures are OK. Next, she depressurizes the cargo carrier, opens the access doors and lowers the loading ramps.

At this point the cargo handlers busily begin loading the cargo carrier with today's cargo while the pilot finishes her daily inspections. She then calculates the amount of fuel that needs to be carried in the thirty one, 1,000 gallon tanks that are in the floor of the cargo carrier's deck. Since the cargo weight and the fuel weight need to be lifted into the air with heat energy, there is no use carrying more fuel than necessary for the today's trip.

The load today is 275 tons of mining equipment that needs to be delivered to a diamond mine that is 250 miles away. The vehicle will then return home, empty of cargo, without refueling. At an 80 mph cruise speed, that will require about 3400 gallons of fuel. No need to worry about adding any reserve fuel as 500 gallons of reserve fuel is always carried aboard on the engine gondola hanging from the envelope cables 100 feet above her cockpit. The reserve fuel should never be touched in normal operation so its weight has to be added to the weight that the ambient temperature helium has to lift. This means that if the reserve fuel is ever used, the pilot would have to vent off helium to land, if the on board cargo weight at the time, is less than the weight of the reserve fuel used to get to the destination.

About an hour before the loading is finished, the pilot turns on the envelope's furnace to bring the internal envelope temperature to 300 degrees. Since the vehicle is lifting a large load today, it will take about an hour for the 100 million BTU furnace to heat the envelope gasses up to a temperature that will lift the vehicle with its cargo and fuel into the air. Since the vehicle is held to the ground by its single mooring cable, there is no worry that the vehicle will lift off prematurely.

With the cargo loaded and the envelope temperature is within 5 minutes of reaching its 300 degree liftoff temperature the pilot closes the ramps and access doors. Then she pressurizes the cargo carrier with air to make it rigid enough to handle the winds at cruise speed. Next, the pilot starts the four 2,000 horsepower propulsion motors.

By the time the engines are running, the mooring cable begins to tighten and the pilot casts off the mooring line. The vehicle begins rising into the air. She sets all four engines to cruise power and then turns the vehicle to the cruise heading with her rudder pedals. The rudder pedals command the fore and aft envelope engines to swing to the left which turns the vehicle.

At this point the pilot increases the commanded envelope temperature to 325 degrees, its maximum operating temperature. This causes the climb rate to increase to 500 feet per minute. At about 2,000 feet the climb rate goes down as the vehicle is reaching the maximum height that 325 degrees will elevate it to today with this large cargo weight and fuel. With less payload it could climb much higher. The vehicle ceiling with no cargo and low fuel is about 28,000 feet.

As the trip progresses, fuel is burned off which allows the vehicle to gradually climb higher. In about two and a half hours it has reached 3,500 feet but it is time to descend. The pilot now switches the furnace control to Climb/Descent Mode and commands a 100 foot per minute rate of descent which should get the vehicle to the mine site at about 500 feet above the drop off point. With this 100 foot per minute descent command, the onboard computer modulates the burner flame intensity to achieve the commanded rate of descent. Although the pilot could easily do this herself, this is a perfect job for a computer and the pilot can do other more important things while descending.

Near the drop off point the pilot switches the burner control to manual. This locks the burner flame size at its current setting which was achieving the 100 foot per minute descent. The final landing position control will use gimbaled engine thrust.

The pilot then lowers the mooring cable to hang 200 feet below the cargo carrier and hovers the cargo carrier near the ground mooring point using the gimbaled fore and aft engines. The joystick in the pilots hand controls the gimbaled engines. The vehicle responds by moving left/right for left/right joystick movement, forward/backward for forward/backward joystick movement, up/down for up/down force on the joystick and a left/right yaw for a left/right twisting force on the joystick. The more joystick displacement left/right and forward/backward or force that is applied to the joystick for yaw and up/down, the more pitch that is applied to the appropriate thrusters. When the pitch reaches the maximum for that propeller, the power level of that thruster is increased up to its maximum power level. Each joystick direction has a trim slide that varies the appropriate thruster forces when the pilot is not holding the joystick.

With this precise control available a ground worker can safely pickup and attach the end of the mooring cable that was extended from the cargo carrier to the ground mooring point. The pilot then winches the vehicle to the ground in the exact location of the ground mooring point. A few minutes before this, the pilot depressurized the cargo carrier so that the loading ramps could be lowered immediately after landing and the access doors opened. Unloading now begins.

As soon as the cable was attached to the ground and the slack removed, the pilot turned off the burner. This began the cool-down that is needed before the vehicle can be released from the ground after the cargo has been unloaded.

Because the pilot knows this ground crew will unload the vehicle quickly, the pilot increases the cool-down rate by opening the aft cool down vents on the envelope and places the aft engine in full reverse thrust. This blows cold air through the envelope, forcing hot air to exit the front overpressure vents. This forced cooling of the envelope air can reduce the buoyancy of the vehicle faster than the weight can be removed from the cargo carrier by the ground crew, in fact, in less than half an hour for this model of air vehicle. In an hour the cargo is unloaded and the vehicle is ready to takeoff for home. The pilot now closes and pressurizes the cargo carrier.

For the return flight the pilot decides to use Climb/Descent Mode on the furnace control since the vehicle is light now and the cruising altitude will be higher. To liftoff with no cargo and only the remaining fuel, the envelope temperature needs only to be a few degrees above ambient, so very little burner will be used. This means the vehicle will be flying high and the pilot will need the pressurized cockpit for the flight home.

To takeoff, the pilot starts the four thruster motors, releases the mooring line from the ground mooring and sets the commanded climb rate to 2000 feet per minute. The vehicle rises within a minute and the pilot heads for home. After 25 miles the vehicle is at 27,000 feet and cruising at about 110 mph. This is the ceiling or pressure altitude with this amount of fuel and cargo. This means that the vehicle is cruising with the helium expanded to near its maximum volume and the burner control has sensed this. The burner control is now modulating the flame based on keeping the helium volume at its maximum operating limit.

About 50 miles from home the pilot selects a 500 foot per minute descent and by the time she is home the vehicle is a couple hundred feet high and ready to land. But, there is no ground person around that can grab the mooring line and attach it to the ground mooring point. This is no problem, the pilot simply lands near her ground mooring point with her joystick thrust control and makes sure that the envelope is cool enough to stay put on the ground for a minute while she gets out and attaches the vehicles mooring cable to the ground mooring point. She then gets back in the cockpit and uses the joystick thrust or a little burner burst to get back in the air while the vehicle winches itself to the ground.

As the pilot shuts down, she notes that there is about 400 gallons of fuel left. She also notes that the whole trip took about 8 hours. Before she leaves, she makes sure that the generator is running and that all pressures are OK.

In an exemplary embodiment of the present invention, there is disclosed system for controlling the lift of an airship for carrying a cargo and a supply of fuel comprising:

a self supporting hull made of a flexible gas impermeable material;

a first gas located in the hull at an internal pressure which is greater than the atmospheric pressure of the air on the outside of the hull;

a bag filled with helium located within the hull and surrounded by the first gas;

a heating means coupled to heat the first gas and the helium;

at least two airship thrusters coupled to urge the airship to travel to a selected destination using the fuel carried by the airship; and a gondola coupled to the self supporting hull;

wherein the bag located within the hull and surrounded by the first gas has enough helium in it at ambient temperature to lift all but the cargo and fuel in the airship;

wherein the first gas and helium when heated provides increased buoyancy due to increased of both expansion of both heated gases to lift the airship with its fuel and cargo.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 28 shows the envelope cooling entrance ducts in an open position on an isolated section of the rear of main envelope.

FIG. 29 shows the envelope cooling entrance ducts in a closed position on an isolated section of the rear of main envelope.

FIG. 30 shows the envelope cooling entrance ducts in an open position on the rear of main envelope and the cooling exit ducts in an open position on the front of the envelope.

DESCRIPTION OF THE PREFERRED EMBODIMENT

Figure 1:
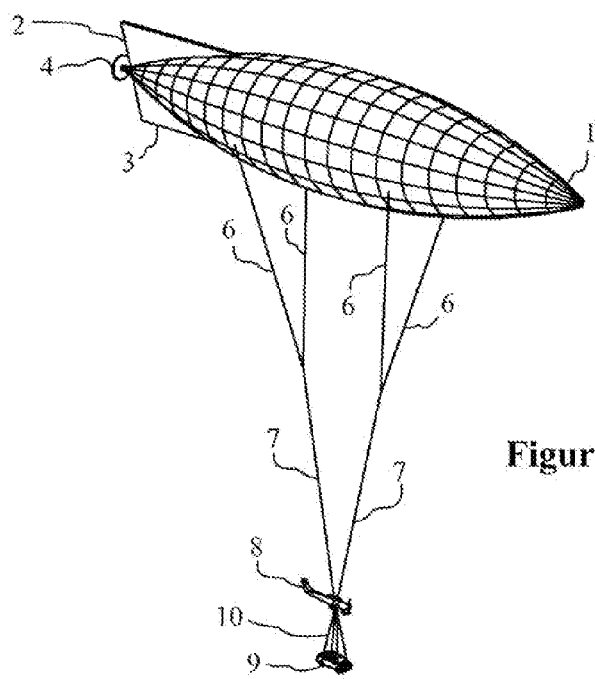
FIG. 1 shows a perspective view of Version 1 of the air vehicle with a cargo load slung below it.

FIG. 1 depicts Version 1 of the air vehicle with a cargo load slung below it. Version 1 is a 240 foot long envelope 1 whose displacement is 250,000 cubic feet. To provide positive yaw stability, two vertical surfaces, 2 and 3 have been attached to the rear of envelope 1. A propulsion unit 4 has been attached to the rear on envelope 1. Propulsion unit 4 is mounted on a swivel to allow it to be angled to the left and right of the vehicle. In doing this, propulsion unit 4 provides yaw control of the vehicle in addition to its use for forward thrust. It is likely that all propulsion units have the ability to provide thrust in both directions through their propeller. Hanging from the envelope 1 are four primary gondola cables 6. The forward two primary gondola cables 6 are joined together at their ends. From this joining point, a secondary gondola cable 7 continues down to the gondola 8. The two rear primary gondola cables 6 are similarly joined and attached to another secondary gondola cable 7. In this Version, gondola 8 is simply a Cessna 172 aircraft fuselage with the wings and horizontal tail surfaces removed. This fuselage, with its motor and landing gear provides all of features needed in our gondola 8 and is a relatively inexpensive and quick solution for a gondola on this size air vehicle.

Slung below the gondola 8 is a cargo load 9, which this airship can deliver. In this case the cargo is a Prius automobile.

Figure 2:
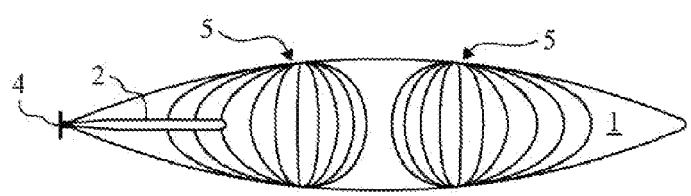
FIG. 2 shows a top view of Version 1 of the air vehicle.

FIG. 2 shows a top view of Version 1 of the air vehicle. The main feature visible in this top view are two load bridles 5 that distribute primary gondola cable 6 loads over a large area of the envelope 1. There are many other options for distributing the primary gondola cable 6 loads to the envelope 1 including load curtains or load patches.

Figure 3:
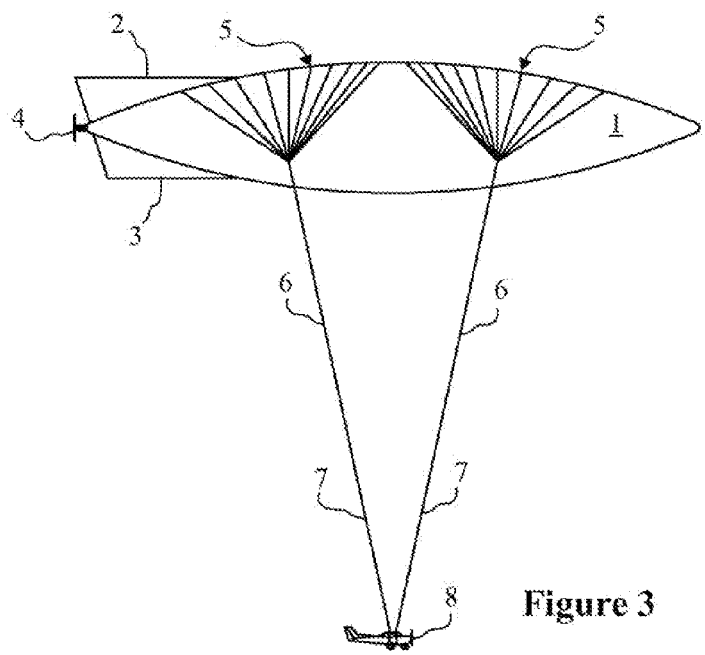
FIG. 3 shows a side view of Version 1 of the air vehicle.

FIG. 3 shows a side view of Version 1 of the air vehicle. This provides a good depiction of how the two load bridles 5 distribute primary gondola cable 6 loads out over the top of envelope 1 in a fan shaped manner.

Figure 4:
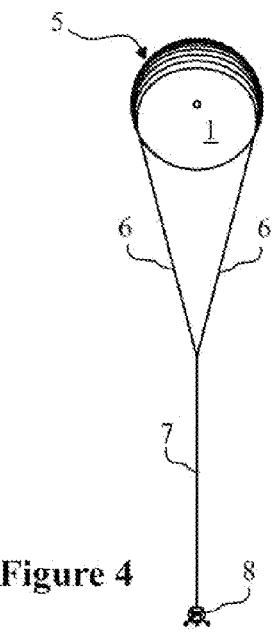
FIG. 4 shows a front view of Version 1 of the air vehicle.

FIG. 4 shows a front view of Version 1 of the air vehicle. This view again shows the load distribution of the primary gondola cables 6 using the load bridle 5 to transfer the loads from one primary gondola cable 6, over the top of the envelope 1 and back to another primary gondola cable 6 on the other side. From this point on, load bridles 5 will be omitted from all drawings for the sake of clarity.

Figure 5:
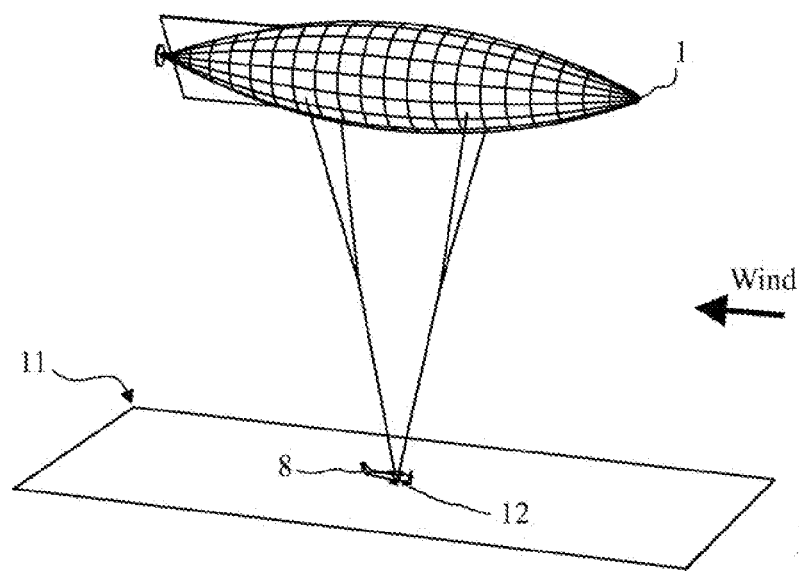
FIG. 5 shows Version 1 of the air vehicle moored to the ground in light winds.
Figure 6:
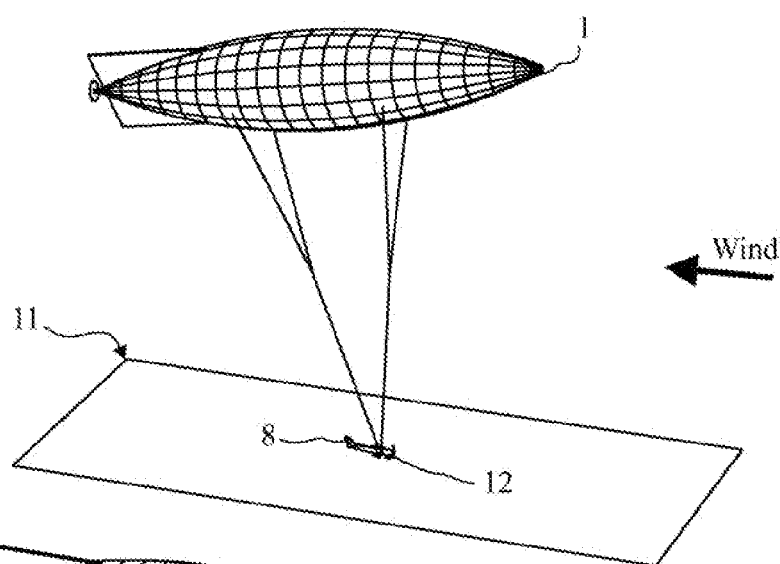
FIG. 6 shows Version 1 of the air vehicle moored to the ground in medium winds.
Figure 7:
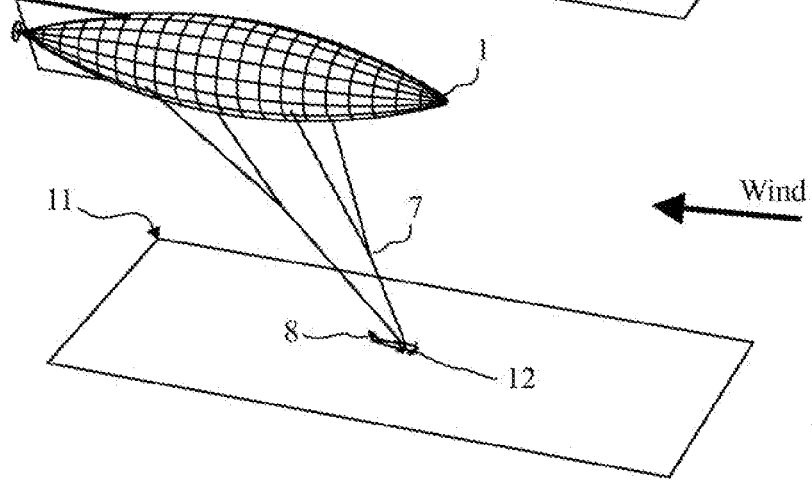
FIG. 7 shows Version 1 of the air vehicle moored to the ground in high winds.

FIG. 5 to FIG. 7 depict Version 1 of the air vehicle moored to the ground, in a field 11, at a single point 12 in increasing winds. In the light winds of FIG. 5, the envelope remains above the gondola 8 without any noticeable affects.

In the medium winds of FIG. 6, the envelope 1 will tend to tilt back a little. Because of the envelope's positive yaw stability, the envelope will weathervane into the wind. This tilted back angle presents no immediate stability problems until the angle increases to an unstable amount.

In the strong winds if FIG. 7, the front secondary gondola cable has been winched in by a winch mounted in the gondola 8. This lowers the nose of the envelope 1 back to a horizontal and stable position. This winching in of the front secondary gondola cable will be activated automatically. All pressurized non-rigid airships, as this one is, require automatic 24 hour a day systems to ensure that the envelope stays pressurized. The power to maintain this comes from generators or plug in electrical cables. Since the power is there for a 24 hour a day system, this winch system for maintaining attitude in high winds in not a significant problem. As a last resort to keep the envelope 1 stable in high winds, the envelope heat can be automatically turned on. This will increase the buoyancy of the envelope 1 and the envelope will rise higher into the wind to a more stable attitude.

If the wind changes direction a large amount, the secondary gondola cables 7 will begin twist as the gondola 8 remains pointed in it original direction. Larger versions of the design have a swivel to take care of this but on this size the solution is to simply add some heat to the envelope 1 which will lift the gondola 8 and then the gondola 8 will automatically spin around to untwist the secondary gondola cables 7. At this point, the gondola 8 can be secured back down to the ground.

Figure 8:
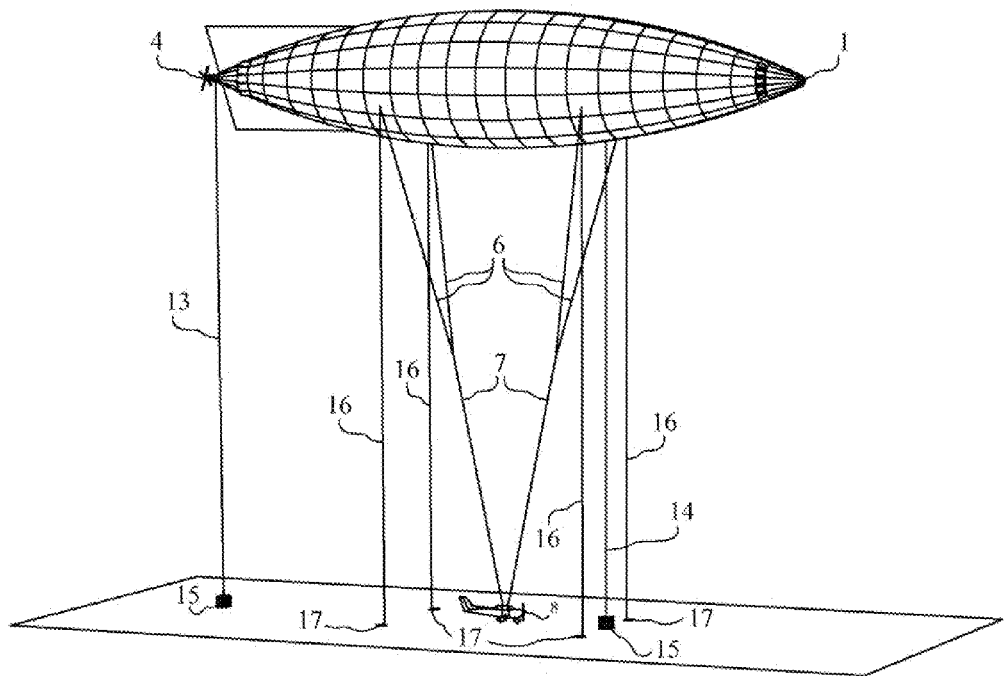
FIG. 8 shows Version 1 of the air vehicle moored to the ground in preparation for winching the envelope to the ground mooring position.
Figure 9:
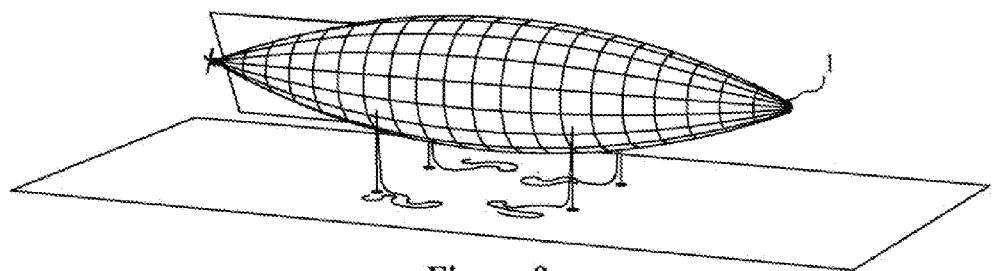
FIG. 9 shows Version 1 of the air vehicle with the gondola removed and the envelope winched halfway to the ground mooring position.
Figure 10:
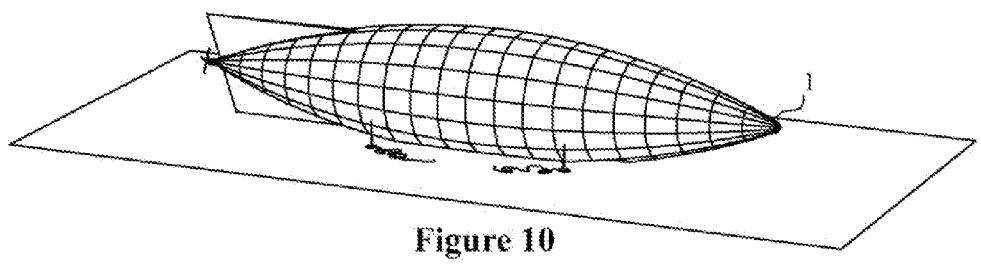
FIG. 10 shows Version 1 of the air vehicle moored to the ground in the ground mooring position.

FIG. 8 to FIG. 10 depict the procedure that will be followed to put the envelope 1 into a moored maintenance position with the envelope 1 securely fastened to the ground. In this state, the envelope 1 mimics an inflatable ground structure.

In FIG. 8, the gondola 8 has landed in the middle of four ground anchor point/winches 17. Here, the maintenance winch lines 13 and 14 are introduced. These lines are lowered from winches attached to the rear and lower middle of envelope 1. They are controlled by remote control or hard wired lines that run up the secondary and primary gondola cables 6 and 7. The purpose of the maintenance winch lines 13 and 14 is to allow a person to be raised up to the envelope 1 in a basket 15 to do maintenance on the propulsion unit 4 and FIG. 17 furnace 23. Maintenance winch lines 13 and 14 are also used to lower the envelope maintenance cables 16 from their stowed position. Once the maintenance cables 16 are lowered and attached to the four ground anchor point/winches 17, the envelope 1 can be winched down to a point where the gondola 8 can be disconnected from the secondary gondola cables 7 and then the gondola 8 can be moved out from under the envelope 1. FIG. 9 shows the envelope 1 in this position with the gondola 8 removed.

FIG. 10 shows the envelope 1 fully winched down and secured in its maintenance mooring position. Approximately 3,000 square feet of envelope 1 has been flattened out onto the ground. With this area of ground contact and with envelope 1 maintained at its normal flying pressure, the four maintenance cables 16 are under significant load and envelope 1 can withstand high winds from any angle.

Figure 11:
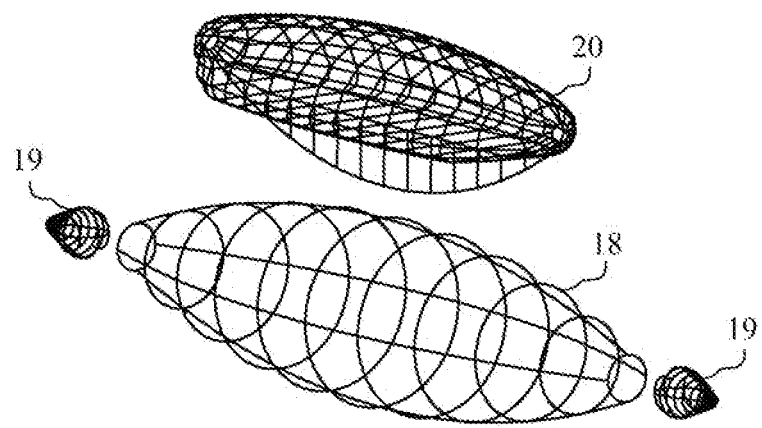
FIG. 11 shows an exploded x-ray view of envelope components of Version 1 of the air vehicle.
Figure 12:
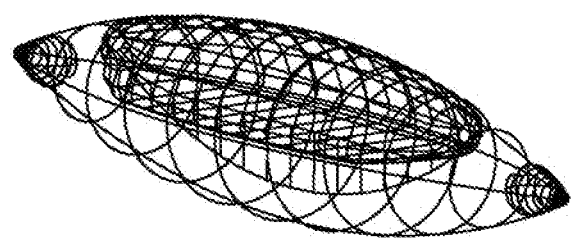
FIG. 12 shows an x-ray view of the envelope components of Version 1 of the air vehicle.
Figure 13:
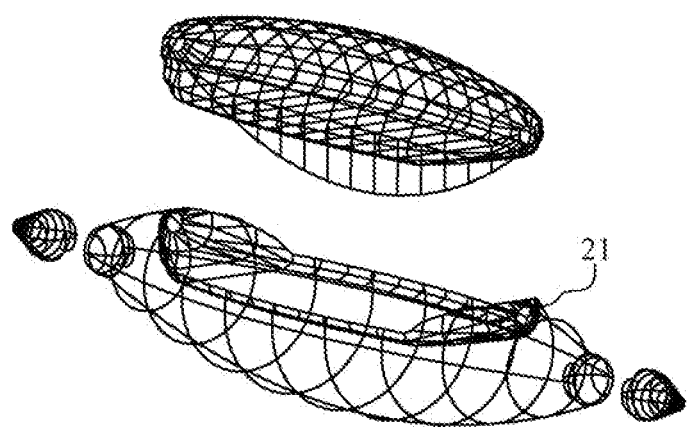
FIG. 13 shows an exploded x-ray view of separate gas areas of Version 1 of the air vehicle.
Figure 14:
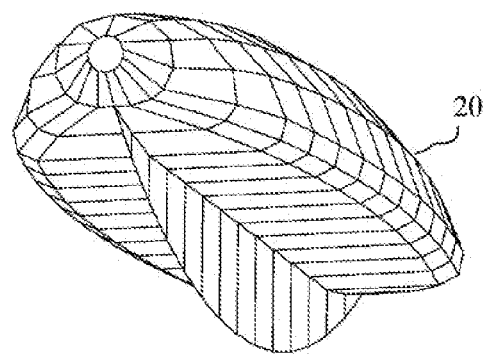
FIG. 14 shows an extracted view of the contracted helium bag of Version 1 of the air vehicle at ambient temperature.

FIG. 11 to FIG. 13 depict the internal structure and components of envelope 1. The basic elements of the flexible fabric elements of envelope 1 are shown in an exploded x-ray view in FIG. 11. The components are the insulated outer fabric shell 18, the helium bag 20 and the ball-cones 19.

The ball-cones 19 are a very significant design element. The shape of ball-cones 19 are spherical and slightly bigger than a half sphere on the end attached to the outer fabric shell 18, and they have a basically conical shape that follows the contours of the FIG. 1 envelope 1 on the end away from the outer fabric shell 18. At some point near the tip of the conical section, another, higher pressure ball-cone 19 can be added. In the drawings shown, the end of the conical sections are just a small half sphere closure and only one ball cone per FIG. 1 envelope 1 end is used. This is a way to create a very streamlined, rigid nose and tail section for air vehicle. The air pressure in the ball cones 19 shown will be at least four times the main FIG. 1 envelope 1 pressure.

In FIG. 11 to FIG. 14, the helium bag 20 is shown with about 100,000 cubic feet of helium in it. With this much helium in the bag and with the bag placed inside the pressurized and insulated outer fabric shell 18, as in FIG. 12, the helium bag takes on the shape shown. There is a lot of helium bag material unexpanded in the lower portion of the helium bag.

FIG. 13 shows an exploded x-ray view of separate gas areas of Version 1 of the air vehicle. The volume of the heated air section 21 of the air vehicle is depicted at about 150,000 cubic feet.

Figure 15:
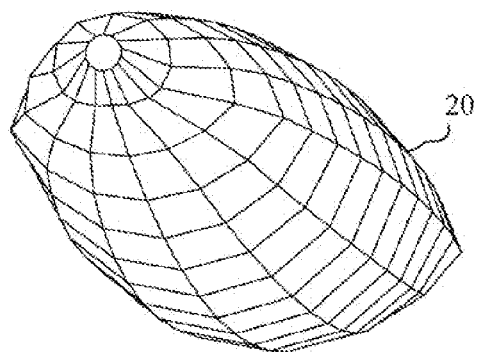
FIG. 15 shows an extracted view of the fully expanded helium bag of Version 1 of the air vehicle at an elevated temperature and/or reduced pressure.

FIG. 15 shows the helium bag 20 expanded to its full size of about 165,000 cubic feet. This would be the condition normally seen at the pressure altitude of an airship.

Figure 16:
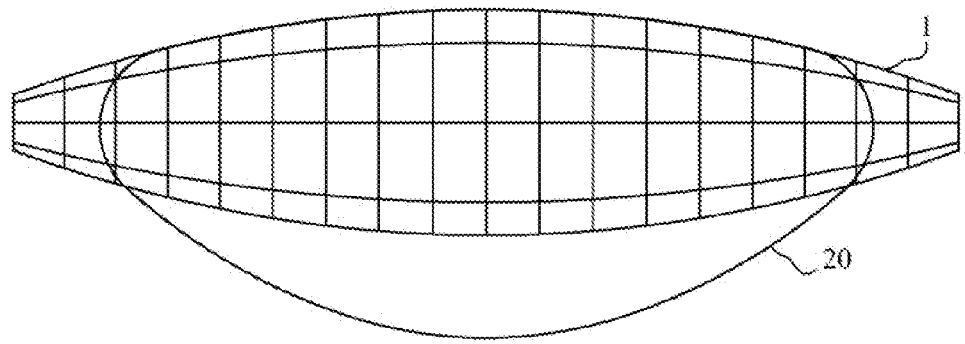
FIG. 16 shows a flat view of the helium bag of FIGS. 14 and 15 compared to a side view of the main envelope.

FIG. 16 shows the shape of the flat and empty helium bag 20 compared to the side view of an inflated envelope 1. Because the helium bag 20 is just a flat shape, it will be easy to manufacture. This shape has also been tested for helium shifting when the pitch attitude of envelope 1 changes. The tests show that with the secondary gondola FIG. 8 cable 7 lengths shown, the airship will be stable in pitch without the need to restrict or secure the helium bag in any way inside the envelope 1.

Version 1 of the air vehicle will have the furnace heat only the heated air FIG. 13 section 21 of the envelope 1. The helium with be heated and cooled by the heat transfer across the helium bag material.

FIG. 17 to FIG. 20 show the design of the helium bag 20 and containment area for Version 2 of the design. This helium bag 20 is designed to have an ambient temperature volume of about 25% of the main envelope 1. The fully expanded helium bag 20 would have a volume of about 85% of the main envelope 1 volume. For positive pitch axis pendulum stability it will likely be necessary to contain the helium to a central location as much as possible while it expands. This is accomplished using a high stretch silicone tubing or equivalent netting 22. This netting 22 is attached to the pressurized air envelope 1 and it will tend to keep the helium in the central un-netted portion of the helium bag 20 as the helium expands yet the netting will stretch easily as it is required to when the helium increase slightly in pressure.

Figure 17:
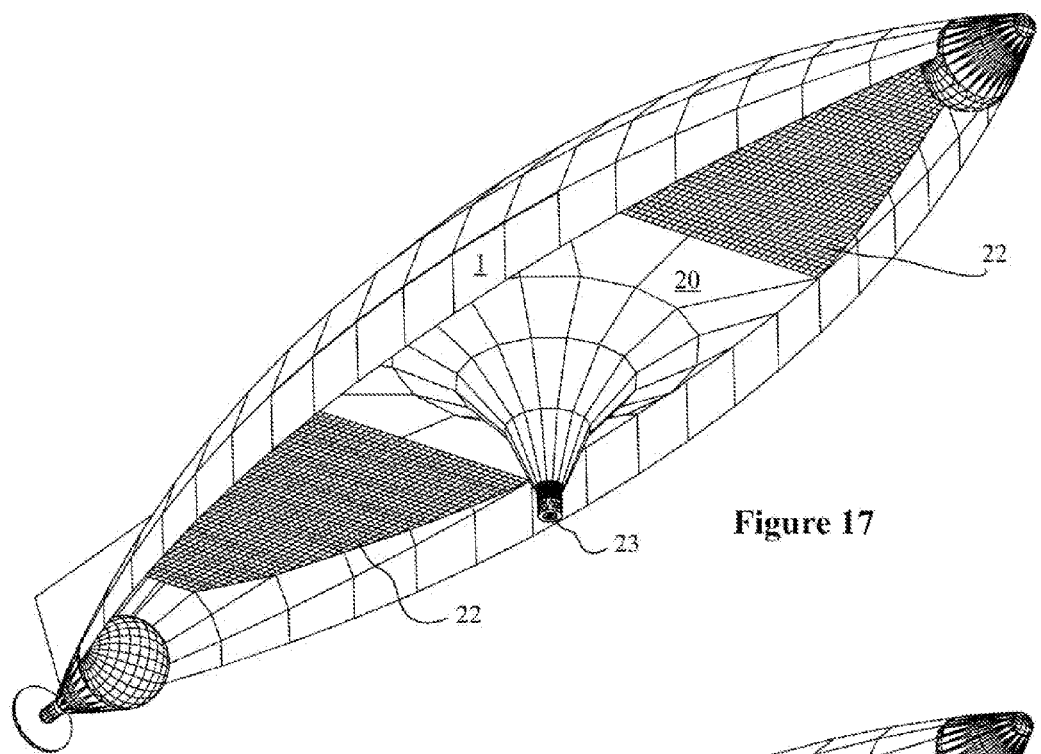
FIG. 17 shows a view of the contracted helium bag of Version 2 of the air vehicle at ambient temperature with the main envelope cut away.

FIG. 17 also introduces location of the furnace 23 in the air vehicle. The depicted furnace heats both the air chamber inside envelope 1 and the helium in the helium bag 20.

Figure 19:
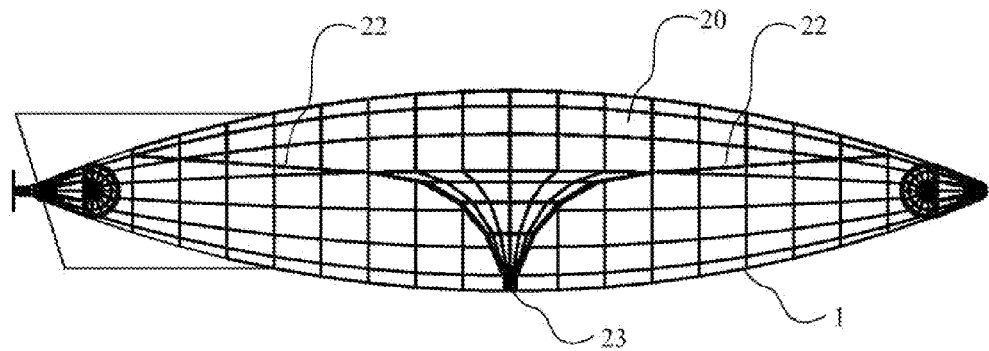
FIG. 19 shows an x-ray side view of the envelope structure of Version 2 of the air vehicle with the helium bag contracted.

FIG. 17 and FIG. 19 show the helium bag 20 at about 25% of the volume of the main envelope.

Figure 18:
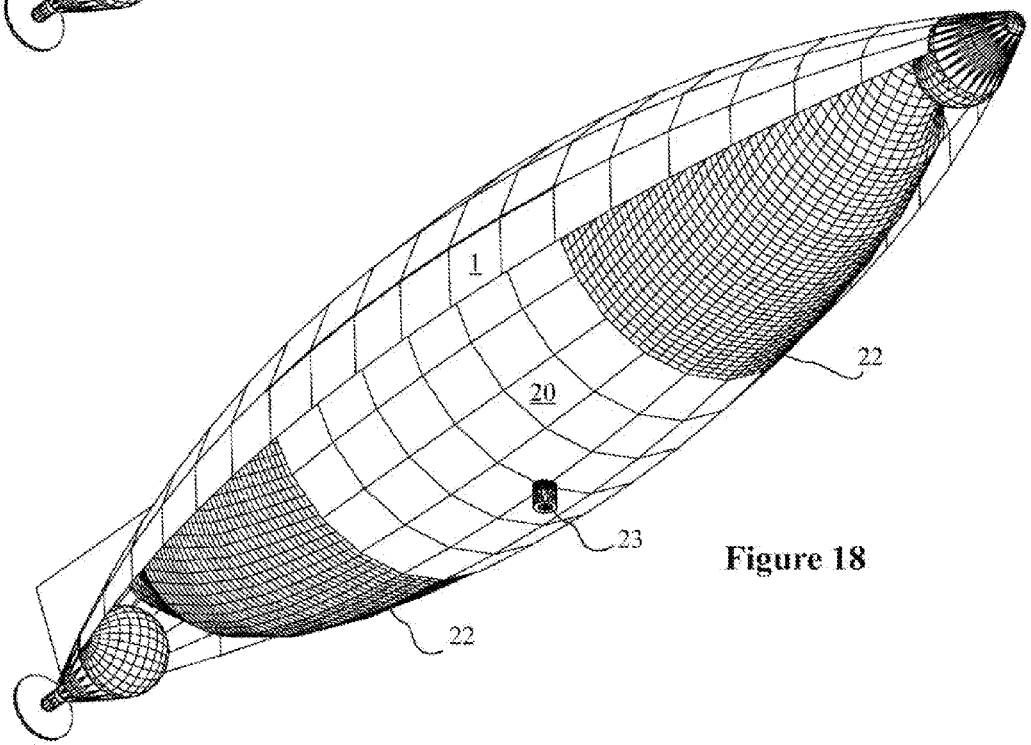
FIG. 18 shows a view of the fully expanded helium bag of Version 2 of the air vehicle at an elevated temperature and/or reduced pressure with the main envelope cut away.
Figure 20:
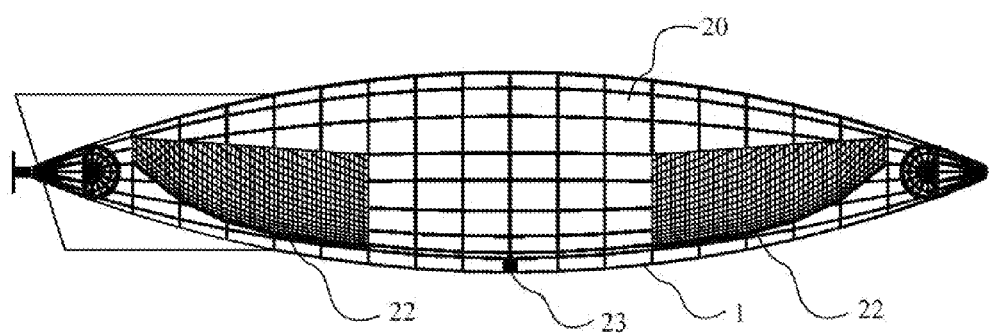
FIG. 20 shows an x-ray side view of the envelope structure of Version 2 of the air vehicle with the helium bag fully expanded.

FIG. 18 and FIG. 20 show the helium bag 20 at about 85% of the volume of the main envelope.

FIG. 21 to FIG. 27 depict a detailed design for a FIG. 17 furnace 23 that heats both the air chamber and the helium chamber. It is centrally located on the bottom of the main envelope 1. Combustion air enters the furnace from the bottom, the heated air from the flames created in the FIG. 21 burner section 24, is sucked up through a zig-zag path to the top of the FIG. 17 furnace 23 where it is forced to turn around and go back down through the central furnace flue. The combusted air then exits out the bottom of the furnace. While the hot combustion gasses zig-zag up the furnace, the zig-zag structure passes through the air and then the helium chambers inside the main envelope 1. Circulation fans in both the air chamber and the helium chamber force air and helium though zig-zag chambers of the furnace to extract heat from then combusted gasses before they return down through the central furnace flue.

Figure 21:
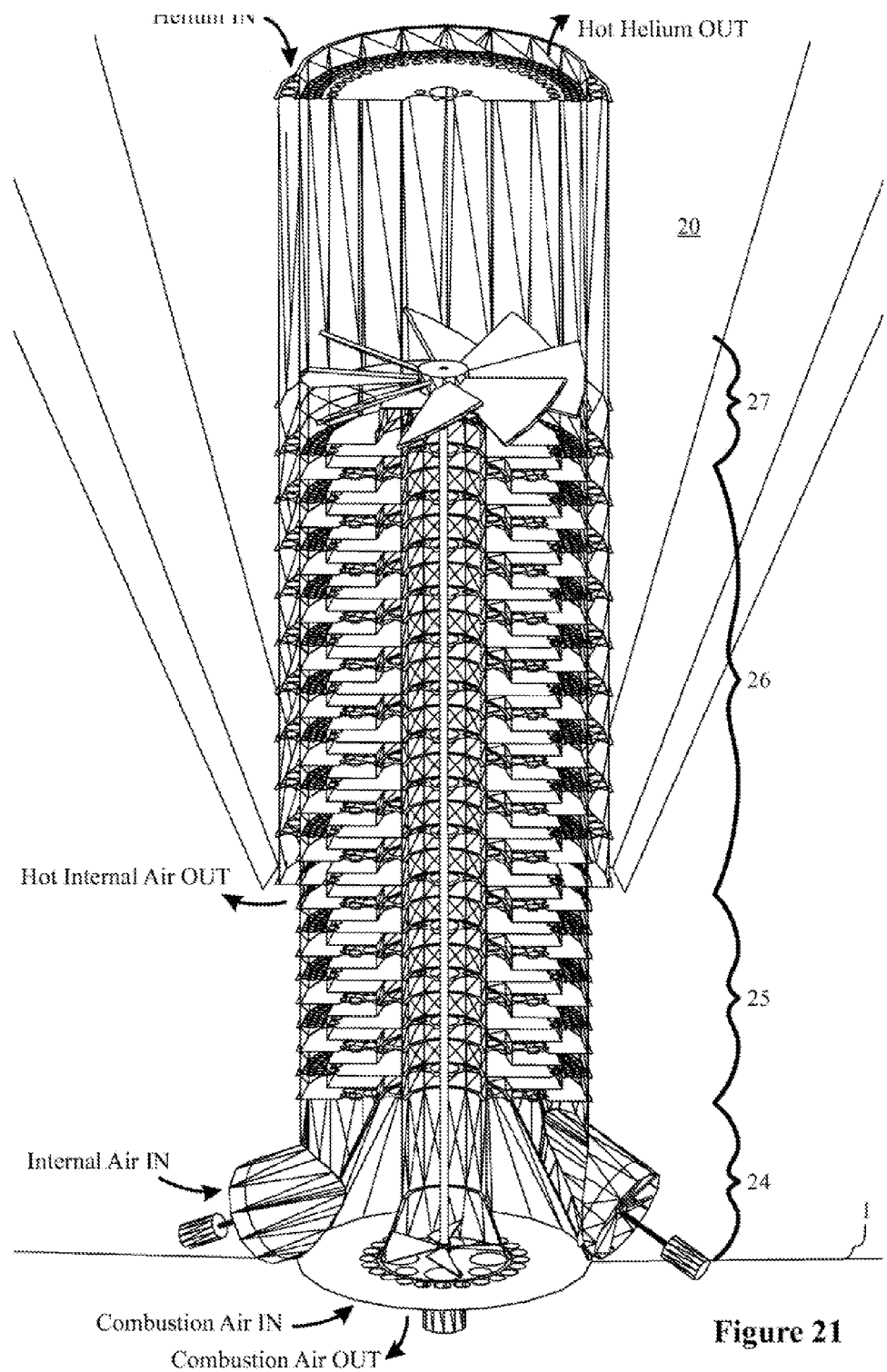
FIG. 21 shows a cut away view of the furnace for Version 2 of the air vehicle.

FIG. 21 shows a cut-away view of the furnace with entry and exit gas flows depicted by arrows. This drawing also isolates the FIG. 21 burner section 24, the FIG. 21 air section 25, the FIG. 21 helium section 26 and the FIG. 21 helium fan section 27. A main goal in designing this furnace was to keep the fan motors outside the main envelope 1.

Figure 22:
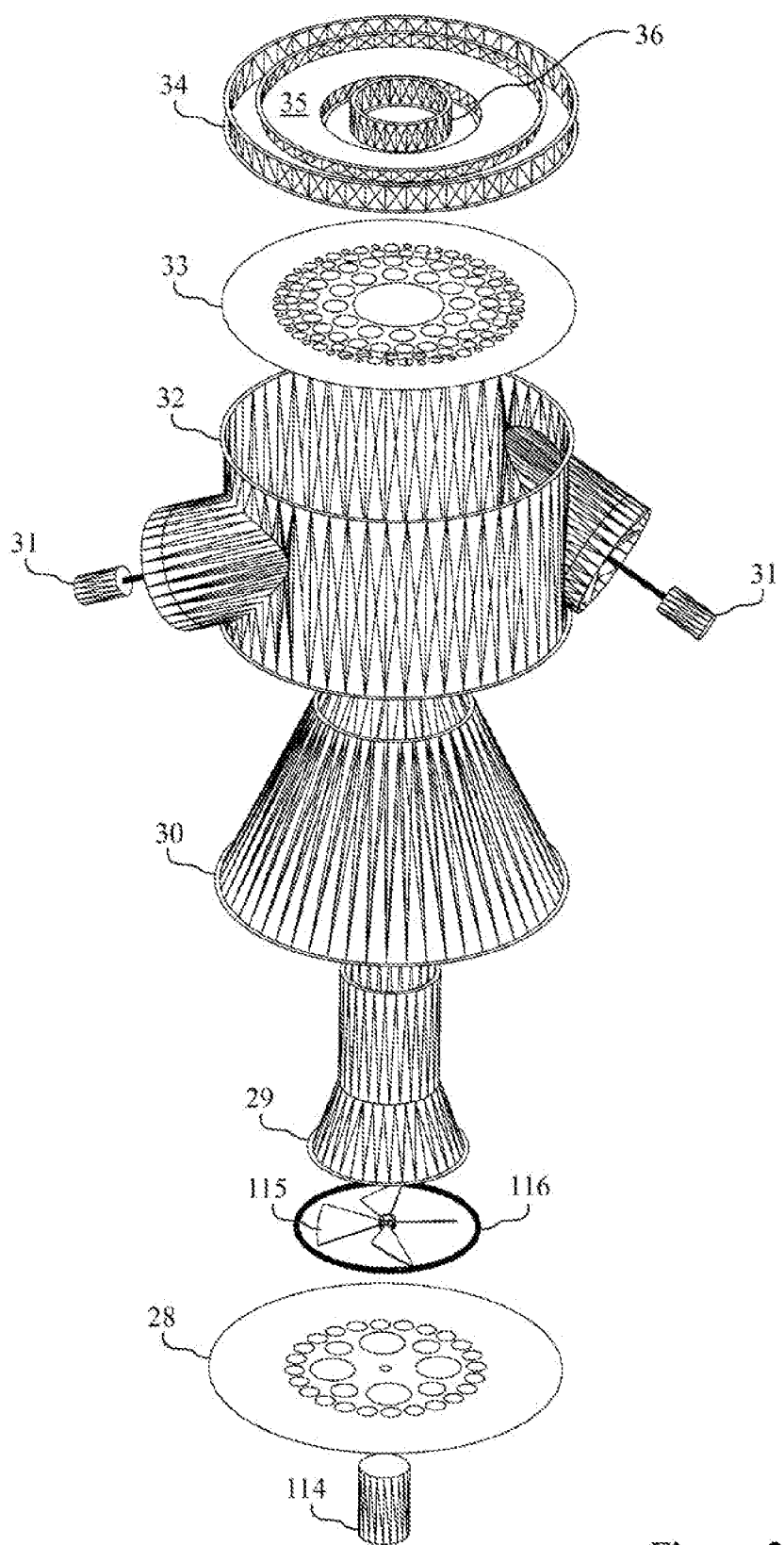
FIG. 22 shows an exploded view of the burner section of the furnace for Version 2 of the air vehicle.

FIG. 22 shows the FIG. 21 burner section 24 of the FIG. 17 furnace 23. Beginning on the bottom is the main furnace fan motor 114. The inlet disc 28 feeds air to the burner ring 116. The combustion air fan 115 is attached to fan motor 114. The main exhaust flue 29 diffuses the combustion air outside the fan motor 114. All central exhaust flue rings are insulated. The combustion chamber cone 30 directs the hot air from the flames to the beginning of the zig-zag heat exchanger. The inlet plenum 32 directs the air from the air fans 31 into the beginning of the zig-zag heat exchanger. The top of the burner section begins with a section of zig-zag heat exchanger using a disc 33, and rings 34, 35 and 36.

Figure 23:
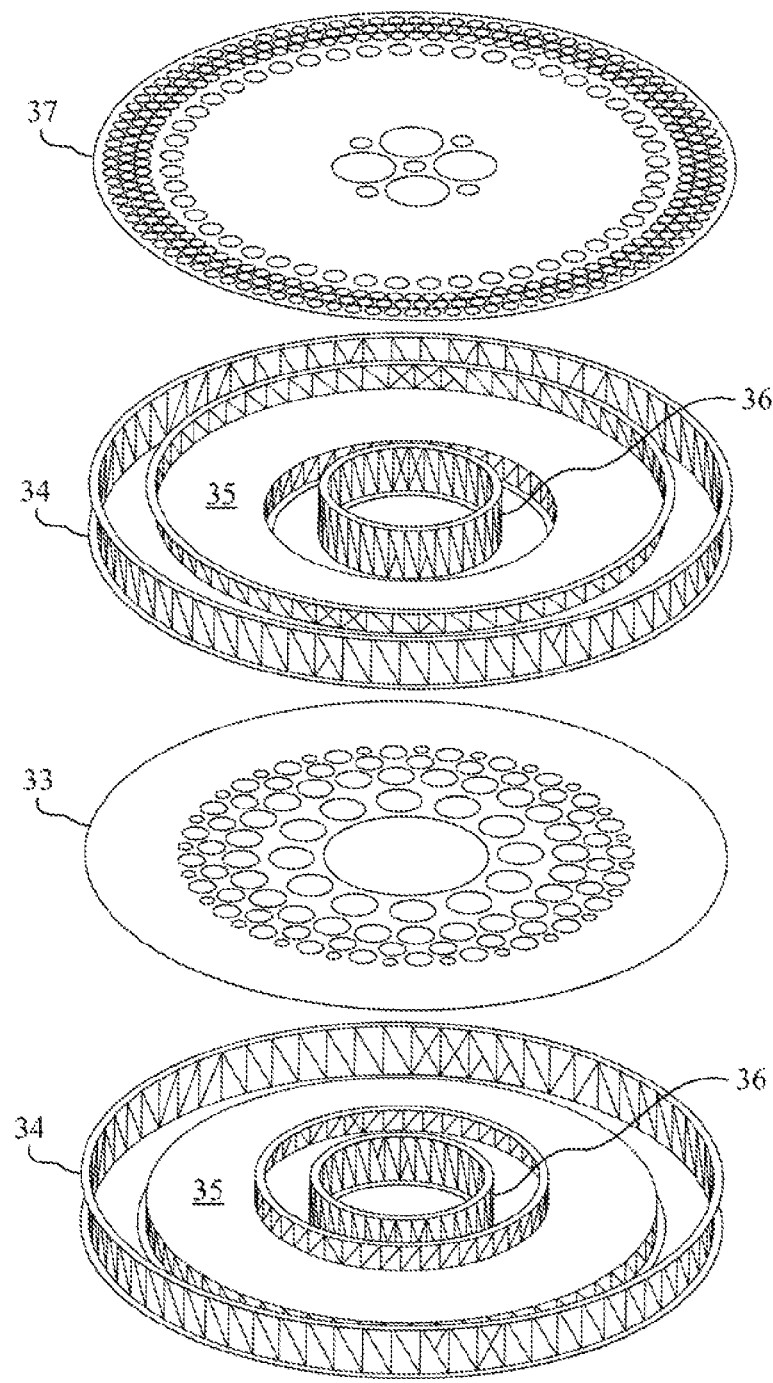
FIG. 23 shows an exploded view of a section of the heat exchanger in the air portion of the furnace for Version 2 of the air vehicle.

FIG. 23 shows a section of the air heat exchanger. This section is repeated until the air heat exchanger is as tall as needed. It begins with rings 34, 35 and 36. Then a disc 33 is attached, followed by rings 34, 35 and 36 again. Then it is topped off with a disc 37.

Figure 24:
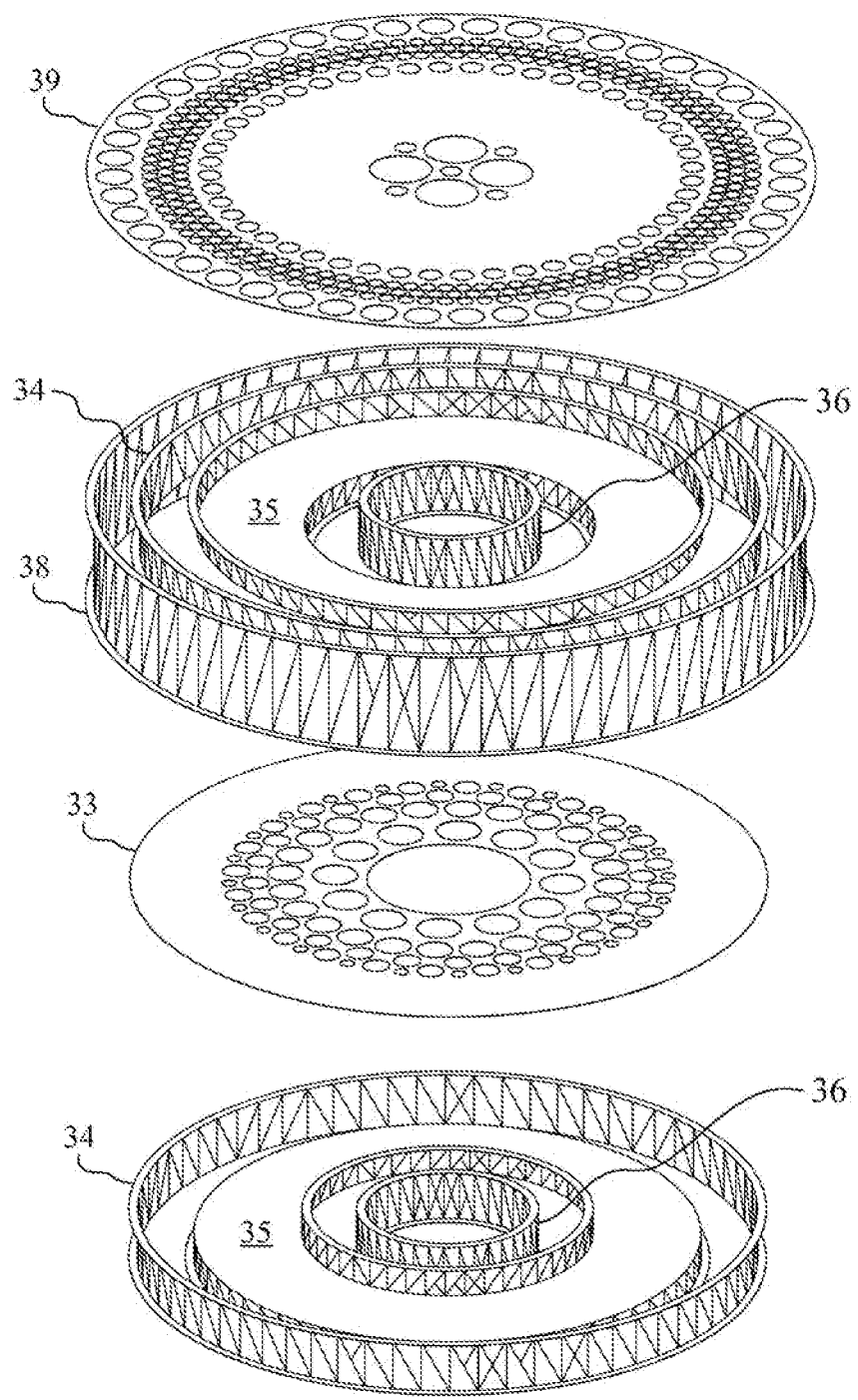
FIG. 24 shows an exploded view of a section of the heat exchanger in the helium portion of the furnace for Version 2 of the air vehicle.

FIG. 24 shows a section of the helium heat exchanger. This section is repeated until the helium heat exchanger is as tall as needed. It begins with rings 34, 35 and 36. Then a disc 33 is attached, followed by rings 34, 35, 36 and 38. Then it is topped off with a disc 39.

Figure 25:
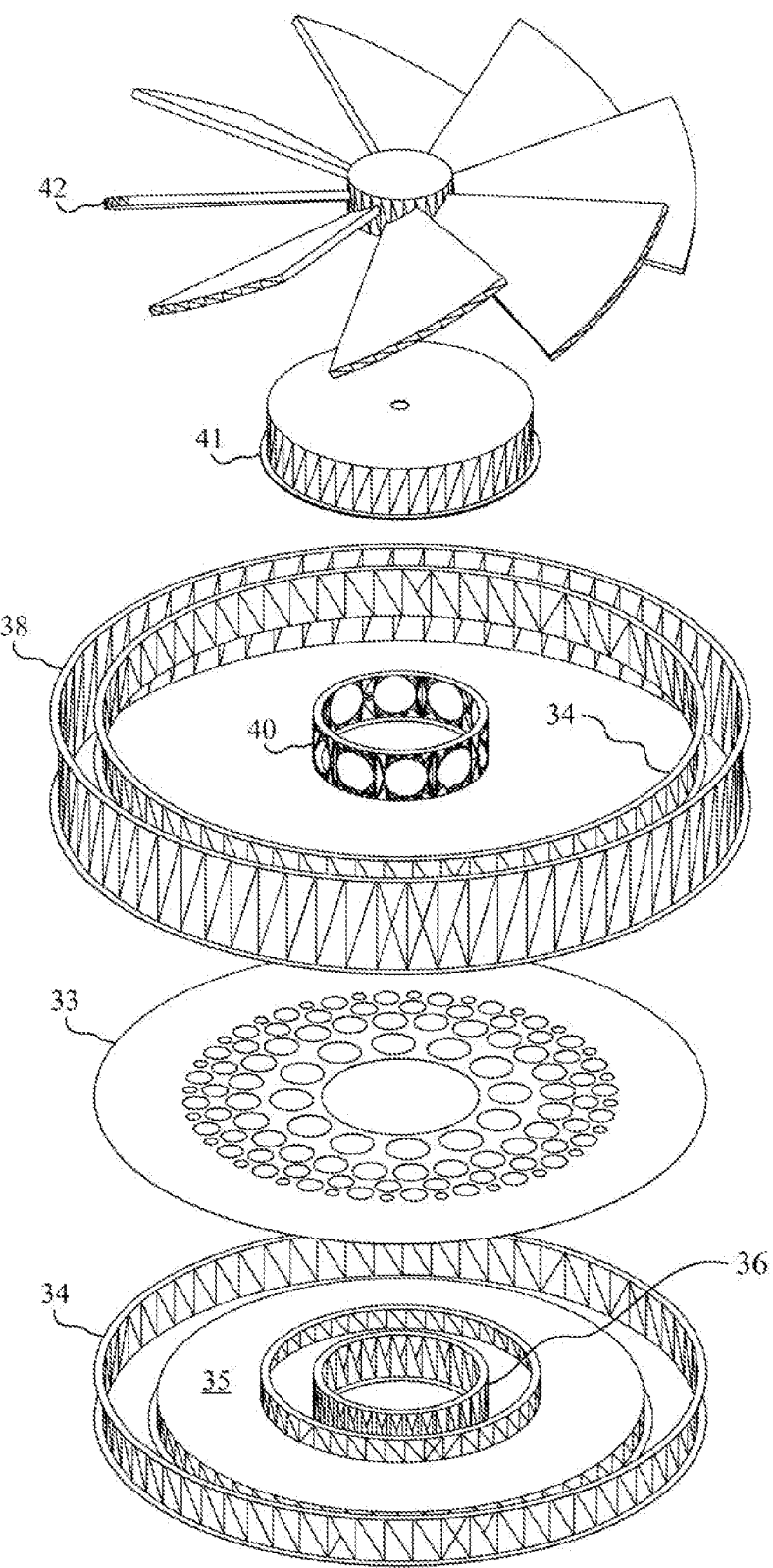
FIG. 25 shows an exploded view of the helium fan section of the heat exchanger in the helium portion of the furnace for Version 2 of the air vehicle.

FIG. 25 shows the helium fan section of the FIG. 17 furnace 23. It begins with rings 34, 35 and 36, followed by a disc 33. Then by rings 34, 38 and 40. It is capped off with cap 41 and the helium fan 42.

Figure 26:
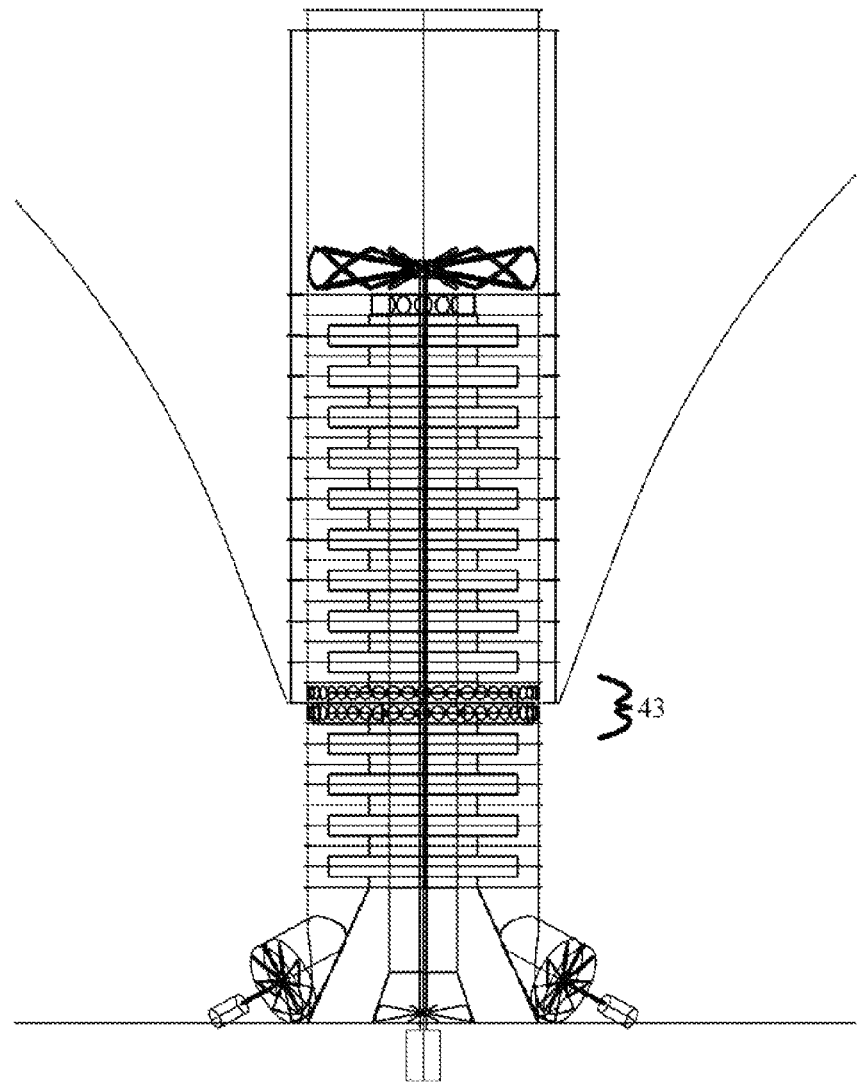
FIG. 26 shows an x-ray view of the furnace for Version 2 of the air vehicle.

FIG. 26 shows an x-ray view of the FIG. 17 furnace 23. This allows the separator section 43 to be visualized. This section separates the air and helium heat exchangers of the FIG. 17 furnace 23.

Figure 27:
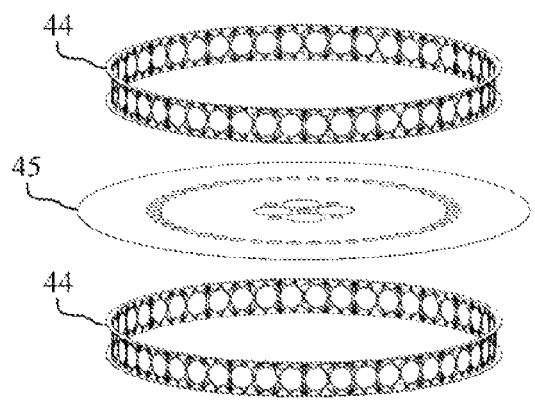
FIG. 27 shows an exploded view of the separator section of the furnace for Version 2 of the air vehicle.

FIG. 27 shows and exploded view of the FIG. 26 separator section 43. Air exhaust ring 44 is followed by disc 45 and then helium entrance ring 44.

FIG. 28 shows the envelope cooling entrance ducts 46 in an open position on an isolated section of the rear of main envelope. When the air vehicle lands with its cargo there is a need to be able to reduce the buoyancy of the vehicle by the weight of the cargo very quickly. Since the weight of the cargo is lifted by the heated gasses in the envelope 1, it is necessary to reduce the envelope temperature quickly so the cargo can be removed with the air vehicle floating away. If the air vehicle gondola/cargo carrier can be moored to the ground, then the cargo can be off loaded right away but it would still be preferable not to have to wait an hour or more to cool before being able to safely take off again. These cooling entrance ducts 46, when opened, allow the propulsion unit 4 to go into reverse thrust and blow cool air through the envelope 1. This air would come out similar flaps in the front of the airship. This would replace hot air with ambient air very quickly. The inlet flaps 48 are spring loaded shut but swing inward when the air pressure on the outside is greater than the pressure inside the envelope. The propulsion unit 4 in reverse thrust will have plenty of power to overcome the internal pressure and open the inlet flaps 48. The cooling entrance ducts 46 are made of envelope fabric and the expanding triangles 47 are rigid material spring loaded to try to return to their closed positions as shown in FIG. 29. When a cable running through the rear edge tubing 50 of the entrance ducts is pulled tight, the entrance duct will close as depicted on FIG. 29. If the cable is released the cooling entrance ducts 46 will open up with any reverse wind flow.

The inlet flaps 48 also have a round, over pressure relief valve 49 in them. This pressure relief valve 49 will let air out of the main envelope 1 any time the internal air pressure gets to high.

FIG. 30 shows the forward over pressure valves 117 open which is what will happen when the FIG. 28 propulsion unit 4 goes into reverse with the FIG. 28 cooling entrance ducts 46 open. The over pressure valves 117 are also there to protect the main envelope 1 from over pressure.

Figure 31:
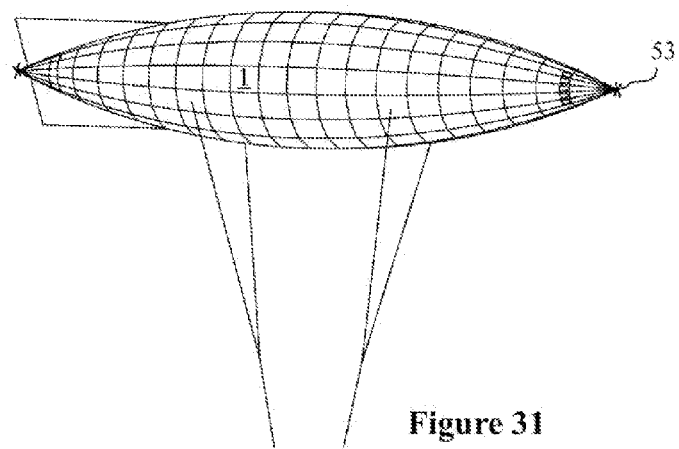
FIG. 31 shows Version 2 of the air vehicle with 4 engines and a cargo carrier structure slung below the gondola.

FIG. 31 shows Version 2 of the air vehicle with 4 engines and a cargo carrier 52 structure slung below the gondola. The gondola 51 is no longer a Cessna 172 fuselage. This Version 2 has an envelope 1 displacement of 24,000,000 cubic feet and is 1,075 feet long. These 4 propulsion engines are at least 2,000 horsepower each. There are two propulsion engines on the gondola 51 and one engine 53 on the nose of envelope 1 and one on the tail of envelope 1. The engines on the nose and tail of envelope 1 may be fully or partially gimbaled to allow the engines to point at a significant angle left/right and/or up/down. With this feature the air vehicle could have full thruster positional control in hover mode. That is, the thrusters could move the vehicle left/right, forward/backward, up/down and yaw left/right. This would be very useful when hovering over a ship to re-fuel at sea.

Also new in FIG. 31 is the permanently attached cargo carrier 52 slung below the gondola 51. This cargo carrier allows loading and unloading cargo into a cargo hold that is bigger than the C5 Galaxy's cargo hold. This cargo carrier has a streamlined shape and is an air pressurized structure.

Figure 32:
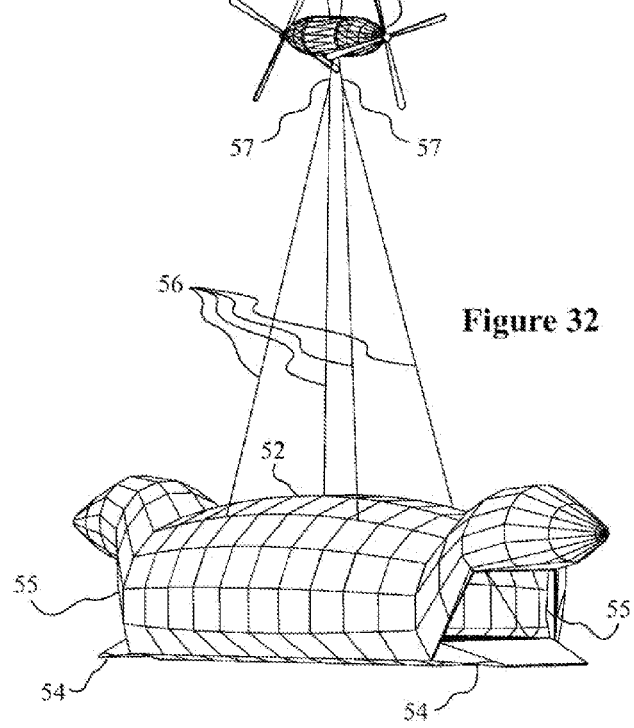
FIG. 32 shows the gondola and cargo carrier of Version 2 of the air vehicle, moored on the ground, with the loading ramps down and the front and rear access doors open.

FIG. 32 shows this cargo carrier 52 on the ground with its loading ramps 54 lowered and it front and rear access doors 55 open. When the doors are open and there is no air pressure in the cargo carrier 52, the basic shape is maintained by a series of carbon fiber hoops. The cargo carrier is connected to the gondola 51 by two external cables 57 which are attached to four cables 56.

Figure 33:
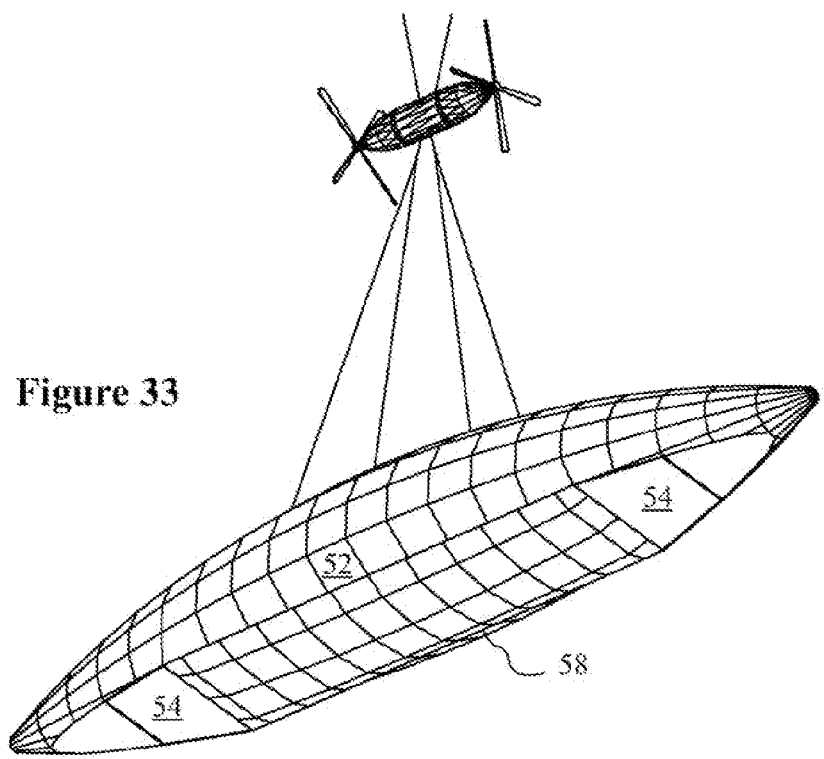
FIG. 33 shows a bottom perspective view of the gondola and cargo carrier in the air.

FIG. 33 shows the bottom of the cargo carrier 52 in the air. The loading ramps 54 seal against the lowered access door 55 (not visible). The flexible landing cushion membrane 58 is a much stronger and durable fabric then the upper fabric of the cargo carrier 52. There will be a couple of feet of air that has to be compressed out of the area below the cargo carrier floor before the cargo carrier 52 settles on its FIG. 34 ball tires 60 under the cushion membrane 58.

Figure 34:
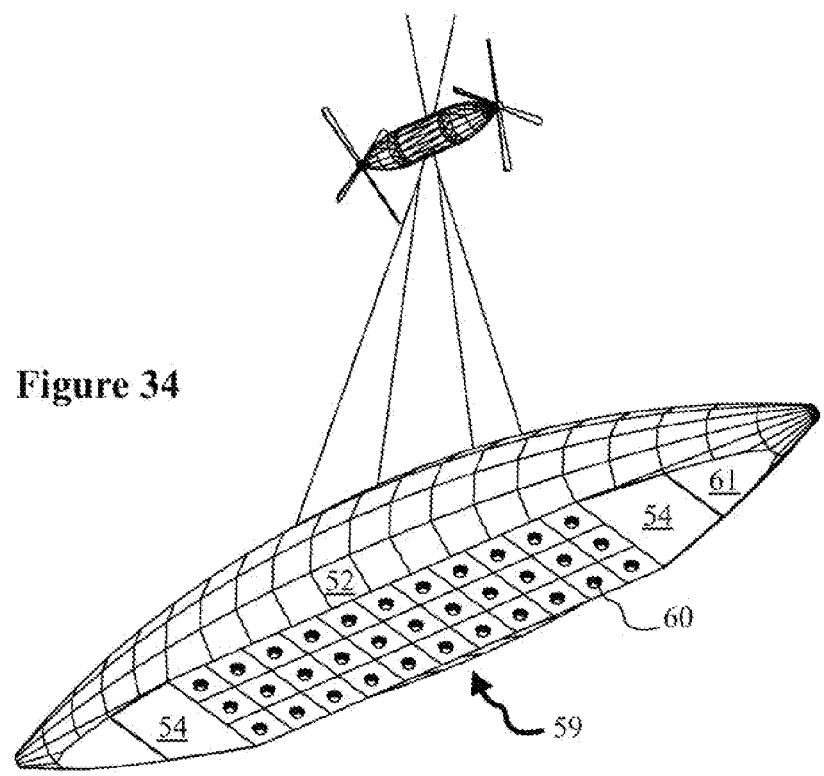
FIG. 34 shows a bottom perspective view of the gondola and cargo carrier in the air with the landing cushion membrane removed.

FIG. 34 shows the cargo carrier 52 in the air with the cushion membrane 58 removed. This exposes the ball tires 60 that are the landing gear of the cargo carrier. Also shown is the pallet array 59 that makes up the cargo carrier 52 load carrying deck. This array is made up of thirty-three ten foot square pallets, each with a ball tire 60 in their centers.

The cargo carrier 52 also contains a pressurized pilot cockpit. The floor of the cockpit 61 is visible here in FIG. 34.

Figure 35:
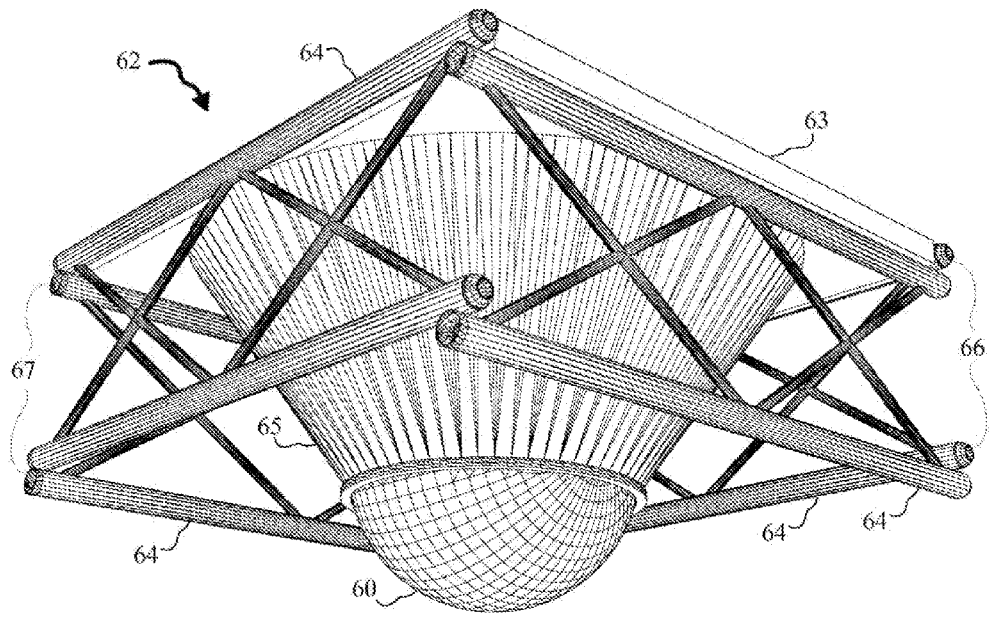
FIG. 35 shows a bottom perspective view of a single pallet from the pallet array that composes the load carrying section of the cargo carrier of Version 2 of the air vehicle.

FIG. 35 shows a bottom view of a single ten foot by ten foot by four foot pallet 62 in the pallet array 59 that makes up the cargo carriers load carrying deck. The basic structure consists of four welded aluminum trusses 64. These trusses 64 are welded together the square shape shown. Into this square frame is welded the aluminum fuel tank (approximately 1,000 gallons) that has the ball tire 60 mounted on the bottom. The top surface where the loads are placed is made up of a composite honeycomb panel 63. Each truss 64 has locating balls 66 mounted on one end and matching locating sockets 67 on the other end. This allows adjoining pallets to be keyed to each other. The socket array is then held together by tensioned cables running through the truss tubes.

Figure 36:
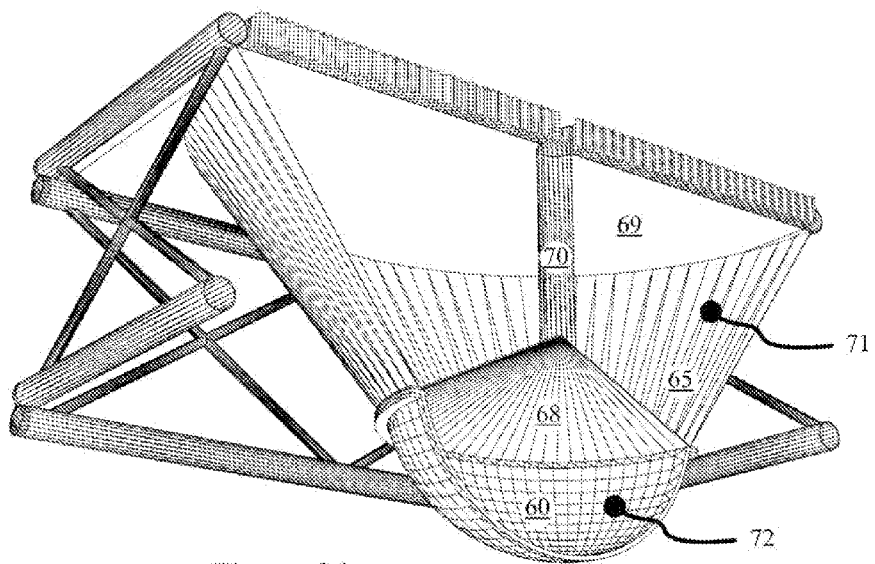
FIG. 36 shows a cut away bottom perspective view of the pallet described in FIG. 32.

FIG. 36 is a section view of FIG. 35 pallet 62 showing the internal chambers. Chamber 71 is the fuel tank. Chamber 72 is the ball tire's 60 pressurized air container. The fuel tank cone 65 serves as a load transfer path to the ball tire 60. The center post 70 also transfers deck load to the ball tire 60. The fuel tank bottom 68 also transfer deck load to the ball tire 60. The aluminum top of the fuel tank 69 is welded to the fuel tank cone and the FIG. 35 trusses 64.

Figure 37:
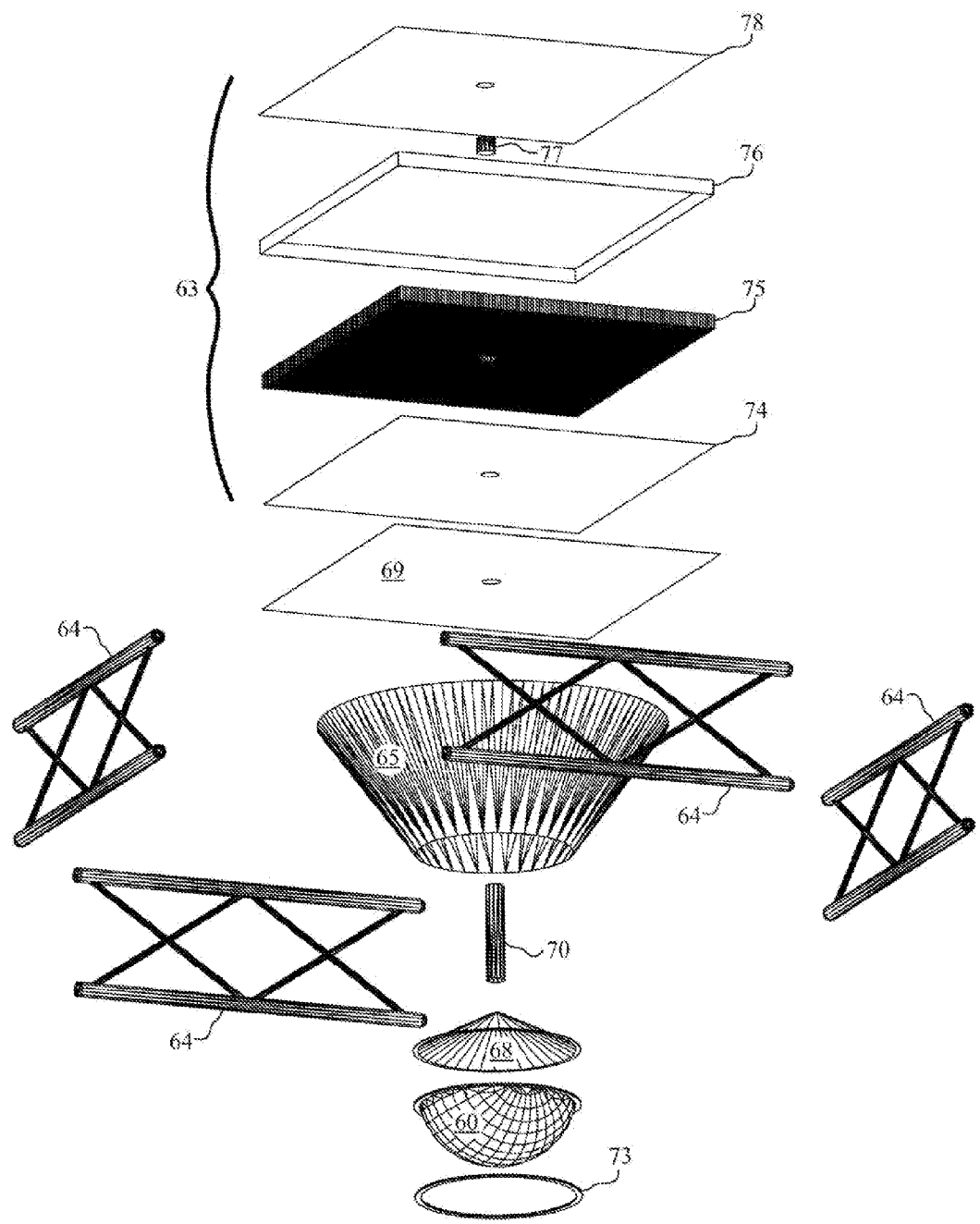
FIG. 37 shows an exploded lower view of the pallet described in FIG. 32.

FIG. 37 shows a few more items more clearly. To make the honeycomb panel 63, the internal honeycomb 75 is faced with composites surfaces 74, 76, 77 and 78. Pressure ring 73 is used to distribute ball tire mounting bolt loads and ensure an air tight seal.

Figure 38:
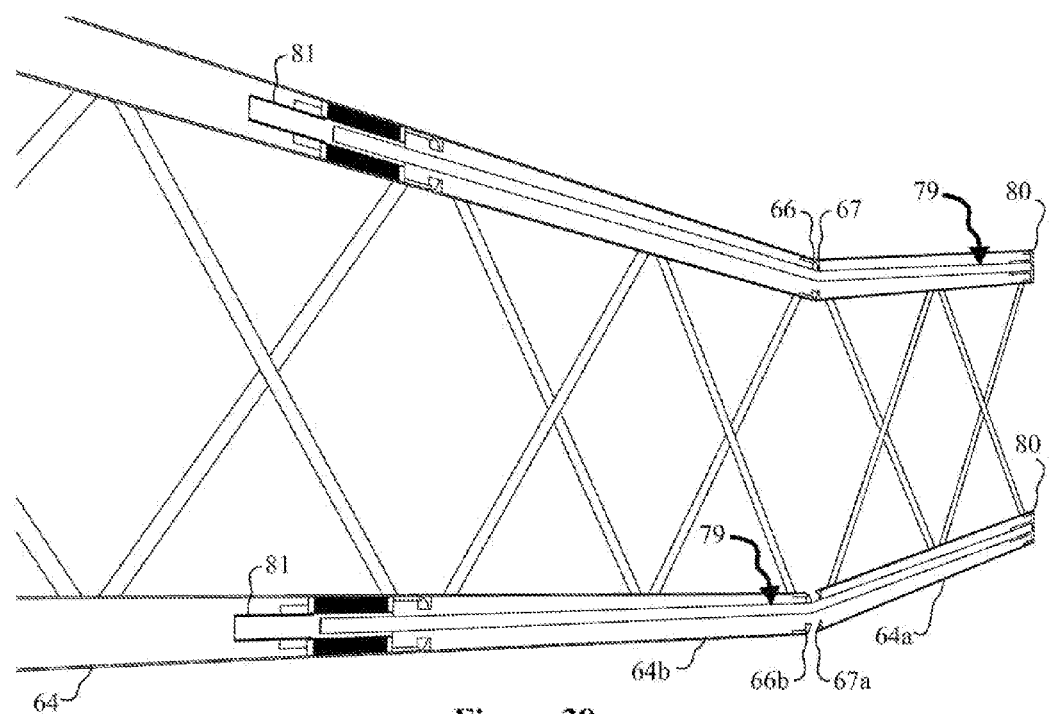
FIG. 38 shows a perspective section view of three side trusses in the pallet array described on FIG. 32.
Figure 39:
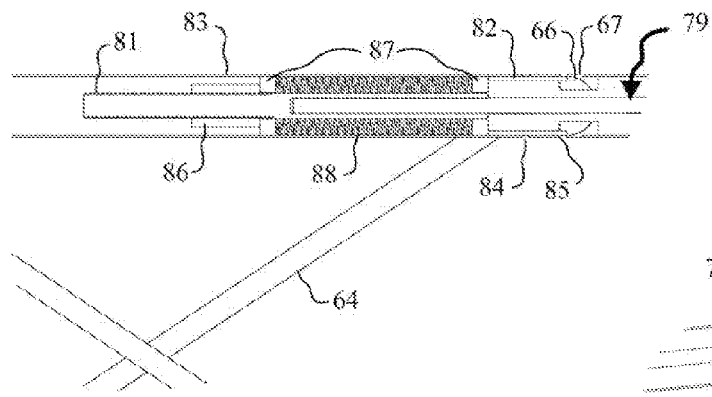
FIG. 39 shows an isolated section view of the spring end of the joining cables for the pallet array described in FIG. 32.
Figure 40:
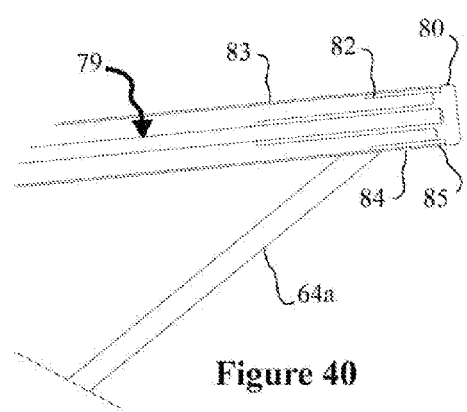
FIG. 40 shows an isolated section view of the swaged cap end of the joining cables for the pallet array described in FIG. 32.

FIG. 38 to FIG. 40 show the details of the tensioned cables 79 that hold the pallet array together. Not only are the tensioned cables 79 under tension but they are also spring loaded. This allows some flexibility in the FIG. 34 pallet array 59. This cargo carrier has the ability to land in rough terrain because of these sprung pre-tensioned cables 79.

FIG. 38 shows a section view of three trusses with the cables 79 holding them together. Truss 64a has been raised up like the FIG. 34 ball tire 60 of the truss 64a pallet is on a big rock. Rather than over stressing and bending the truss, the lower sprung cable 79 is stressed enough to compress the springs that are attached to it. This allows the truss 64a to bend at the edge without breaking and the ball tire from truss 64b touches the ground to relieve the load on the cables.

FIG. 39 shows the details of the sprung end of the cable 79. In one end of each large truss tube, a sleeve 82 is firmly welded in by a full end fillet weld 85 and a number of rosette welds 84. This sleeve 82 transfers the full cable load to the large truss tube 83. FIG. 35 Balls 66 and FIG. 35 sockets 67 are removable items and are snapped into place. A stack of spring washers 88 and two pressure washers 87 are slid into the large tube 83 to contact sleeve 82. The end of the cable has a swaged on metal threaded rod 81 which is placed through the washer stack and a nut 86 is screwed onto threaded rod 81. This nut is tightened until the cable has the required pretension.

FIG. 40 shows a section view of the swaged cap end of cable 79. The FIG. 35 ball 66 has been removed from this truss 64a. Sleeve 82 has been welded at 84 and 85 as in FIG. 39. This end of cable 79 has a cap end 80 swaged onto it. The cap end 80 mates into sleeve 82 and holds this end of the cable 79 securely in place.

Figure 41:
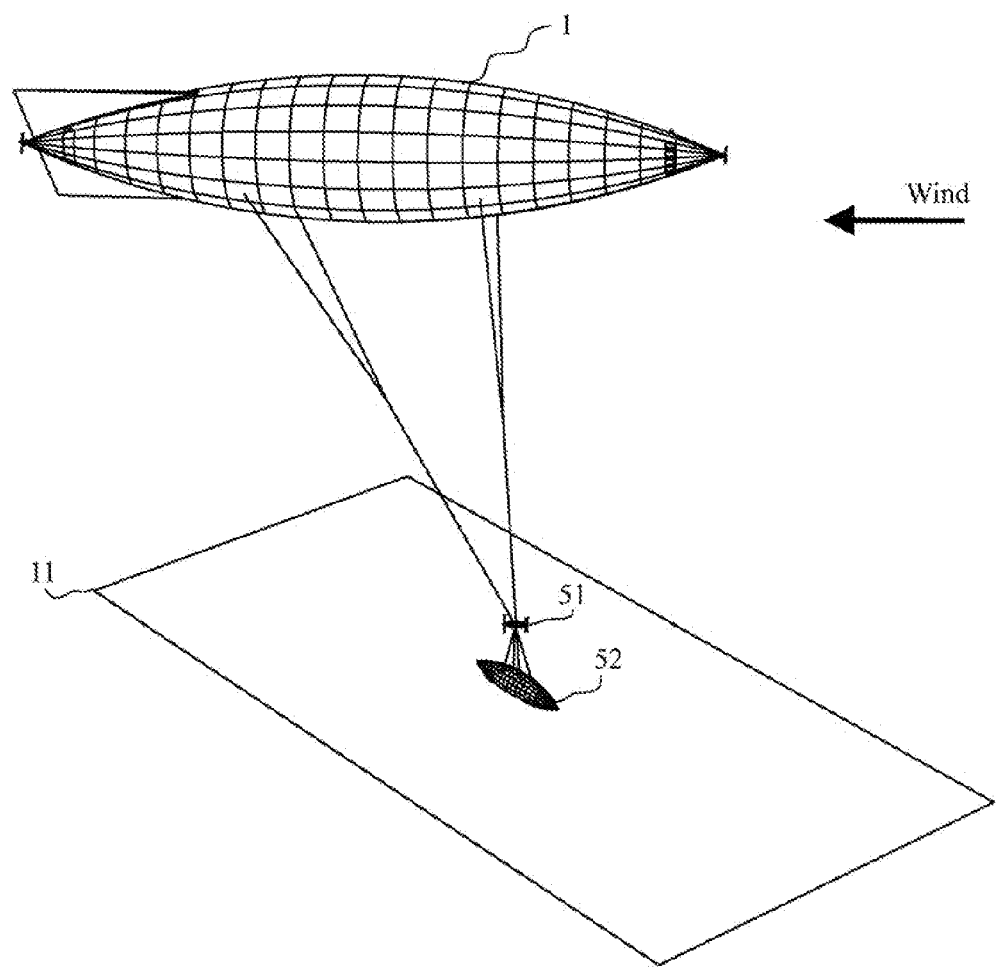
FIG. 41 shows Version 2 of the air vehicle on a single point ground mooring, in high winds that have shifted 45 degrees since the vehicle landed.

FIG. 41 shows Version 2 of the air vehicle on a single point ground mooring, in high winds that have shifted 45 degrees since the vehicle landed. Rather than having the gondola cables twist up when the wind shifts like this the gondola 51 can be made with a swivel in it and there is no need to reposition the cargo carrier 52 until the winds have shifted more than 200 degrees. This swivel is detailed in FIG. 43.

Figures 42, 43:
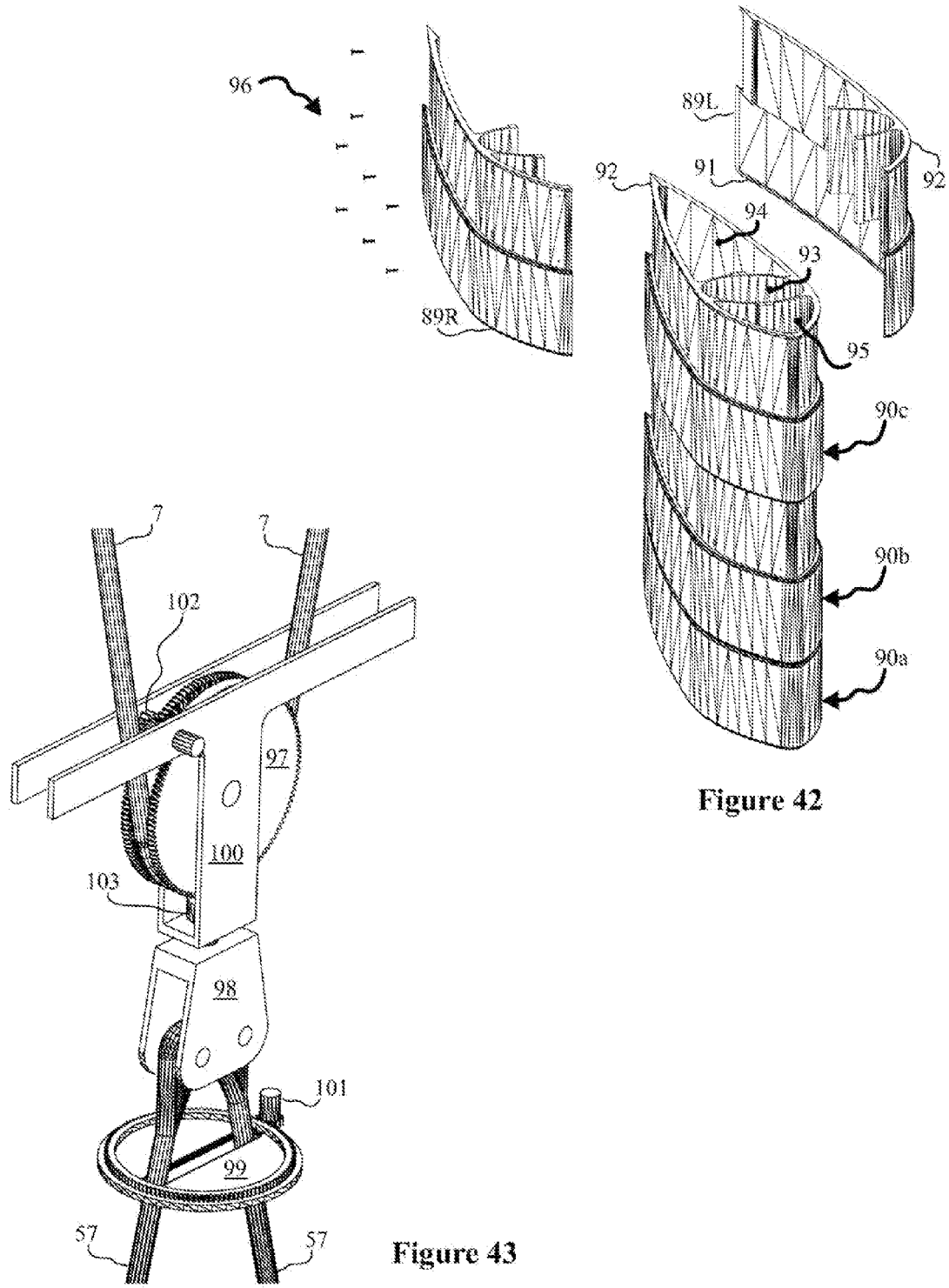
FIG. 42 shows an expandable streamlining cuff assembly for the gondola and cargo carrier support cables.
FIG. 43 shows the internal load transfer structure of the gondola.

FIG. 43 shows the internal load transfer structure of the gondola and includes a swivel if needed. The cargo carrier cables 57 enter the bottom of the gondola through a slot in the floor. This slot is in a disc 99 that is allowed to rotate in a groove in the floor. The disc 99 has gear teeth on it to enable a gear motor 101 to rotate or lock the disc where desired. If the gear motor is moved out of gear meshing range the disc would rotate freely, due to the swivel pin 103, if the wind changed direction and the gondola cables 7 began to rotate with the wind change. If you were to takeoff with the cargo carrier out of line with the main FIG. 1 envelope 1 you could engage the gear motor 101 and straighten the FIG. 41 cargo carrier 52 out. Pulley 97 has a narrow angle groove in it so that when the gondola cable 7 is loaded, the gondola cable 7 is tightly wedged into the pulley and it will not slip, however gear motor 102 could still rotate the pulley and raise or lower the nose of the FIG. 1 envelope 1. Frame 100 attaches to the roof of the FIG. 41 gondola 51 and carries the whole weight and thrust loads of the FIG. 41 gondola 51.

The FIG. 8 gondola cables 6 and 7 and the FIG. 32 cargo carrier cables 57 and 56 present a significant drag penalty due to their frontal area, shape and length. If the cables were streamlined the amount of drag becomes insignificant. Therefore FIG. 42 shows a collapsible streamlined cuff that could be used on section of the cables that collapse and expand (FIG. 43 cable 7 near the gondola). Also, a lot of the cables will have fuel or electric lines running up and down them. The cuff presents a way to deal with those fuel and other lines by running them in chambers 94 or 95 of the cuff.

In FIG. 42, cuff 89R is about to be joined to cuff 89L with screws 96. When this new 89LR cuff is screwed together so that lip 92 of cuff 90c is inside and above lip 91 of cuff 89L, the new 89LR cuff should slid up and down on cuff 90c. You can also see the collapsing ability by looking at cuff 90a and 90b which are fully collapsed. Cuff 90b and cuff 90c are fully extended. The heavy load cable runs in the round chamber 93. On sections of the cables that do not need to extend and contract, a cuff similar to cuffs 89L and 89R can be made with without the extending feature.

Figure 44:
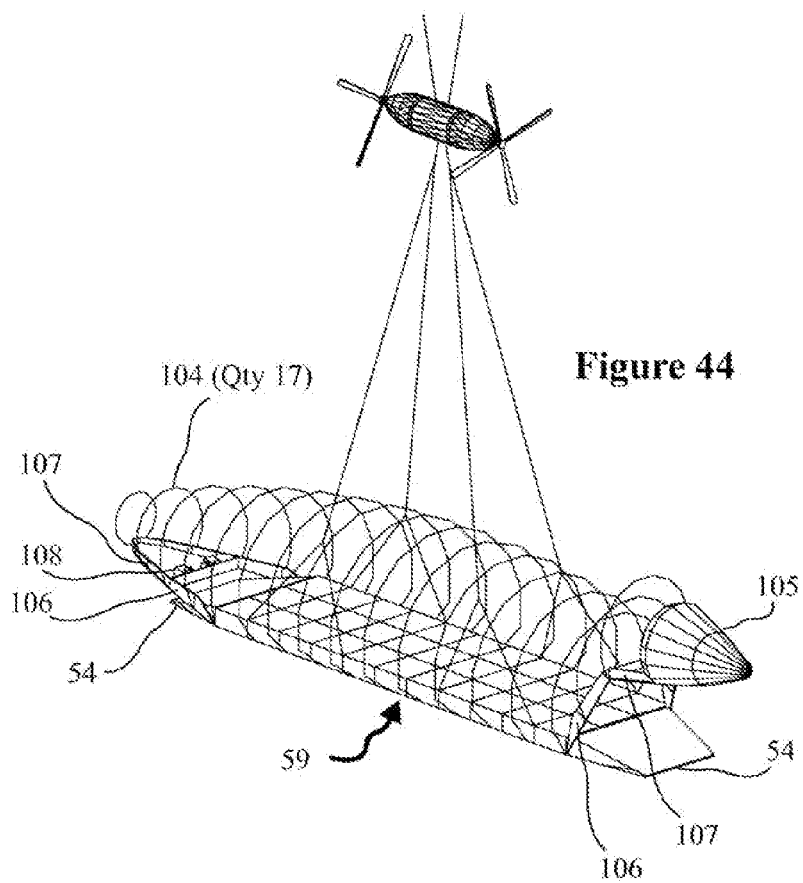
FIG. 44 shows a front skeleton view of the cargo carrier with the fabric cover removed, the loading ramps down and the front access door open.
Figure 45:
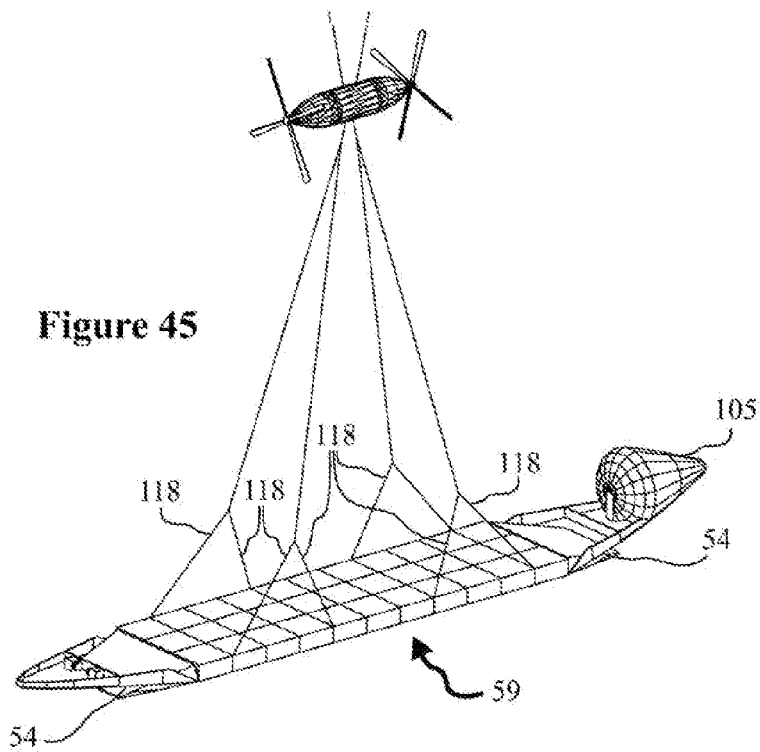
FIG. 45 shows a rear skeleton view of the cargo carrier with the fabric cover and hoops removed, the loading ramps down and both front access doors closed.
Figure 51:
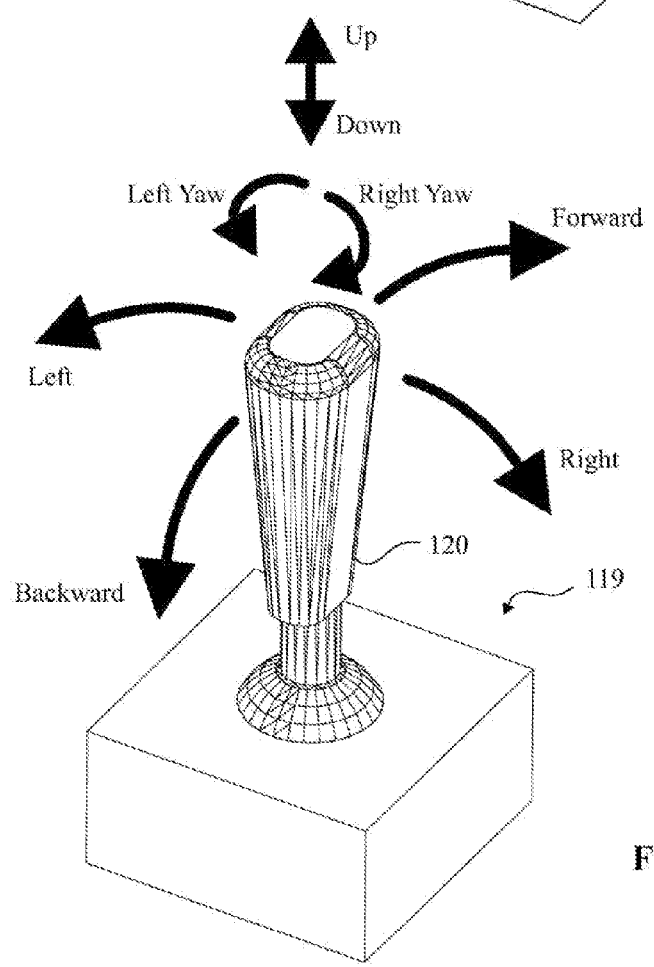
FIG. 51 shows a joystick control to operate thrusters

FIG. 44 shows a front skeleton view of the FIG. 51 cargo carrier 52 with the fabric cover removed, the loading ramps 54 down and the front access door 106 open. There are seventeen carbon fiber hoops 104 that hold the removed fabrics shaped when the access doors 106 open and the shell looses pressure. You can clearly see the pallet array 59. The cockpit 105 is raised and lowered with the access door 106 but it is still accessible by ladder. In the rear of the FIG. 51 cargo carrier 52 and on the tray 107, are two electric generators 108 used for providing electric power to all areas of the vehicle. Only one generator is needed at any time and the other is a backup. This is also the generator that needs to run when to keep the FIG. 1 envelope 1 pressurized while moored on the ground. FIG. 45 is a rear view of the same skeleton with the front access door closed and the hoops 104 removed. Exposed now are the internal cargo carrier load cables 118, these load cables further distribute the cargo carrier cable loads to the pallet array 59.

Figure 46:
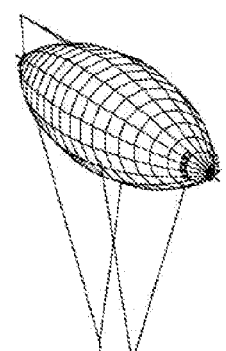
FIG. 46 shows Version 2 of the air vehicle having just landed at a site with nine mooring points that allow full maintenance of the vehicle.
Figure 46:
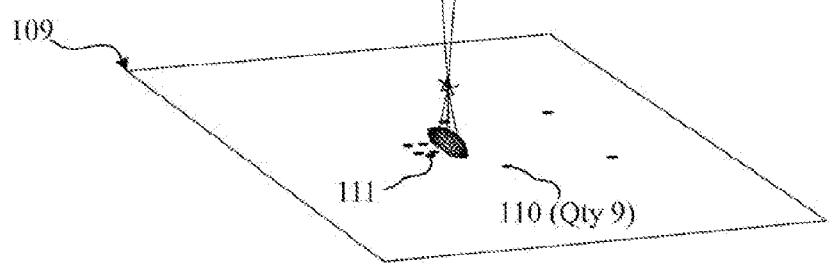
Figure 47:
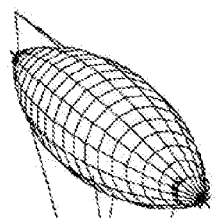
FIG. 47 shows Version 2 of the air vehicle repositioning itself to the main single point mooring location of the site described in FIG. 46.
Figure 47:
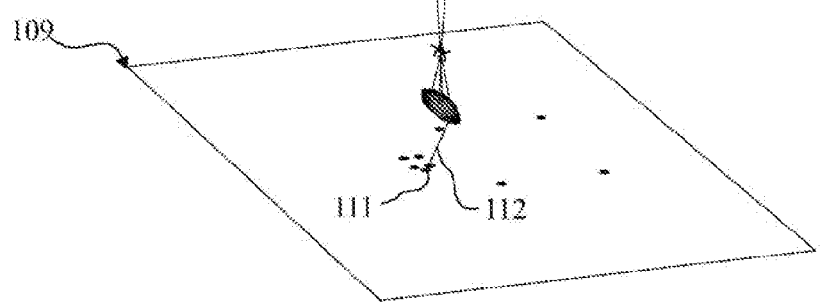

FIG. 46 to FIG. 51 depict the procedure to do a full maintenance mooring at a site 109 equipped with the nine mooring points that allow full maintenance of the vehicle FIG. 46 shows Version 2 of the air vehicle having just landed at the site 109 near the single point mooring location 111. At this point a mooring cable is extended from a winch on the FIG. 51 cargo carrier 52 and attached to the single point mooring location 111. The pilot then takes off again as in FIG. 47 and winches the air vehicle back to the ground, but this time the vehicle is position precisely over the cargo carrier mooring points.

Figure 48:
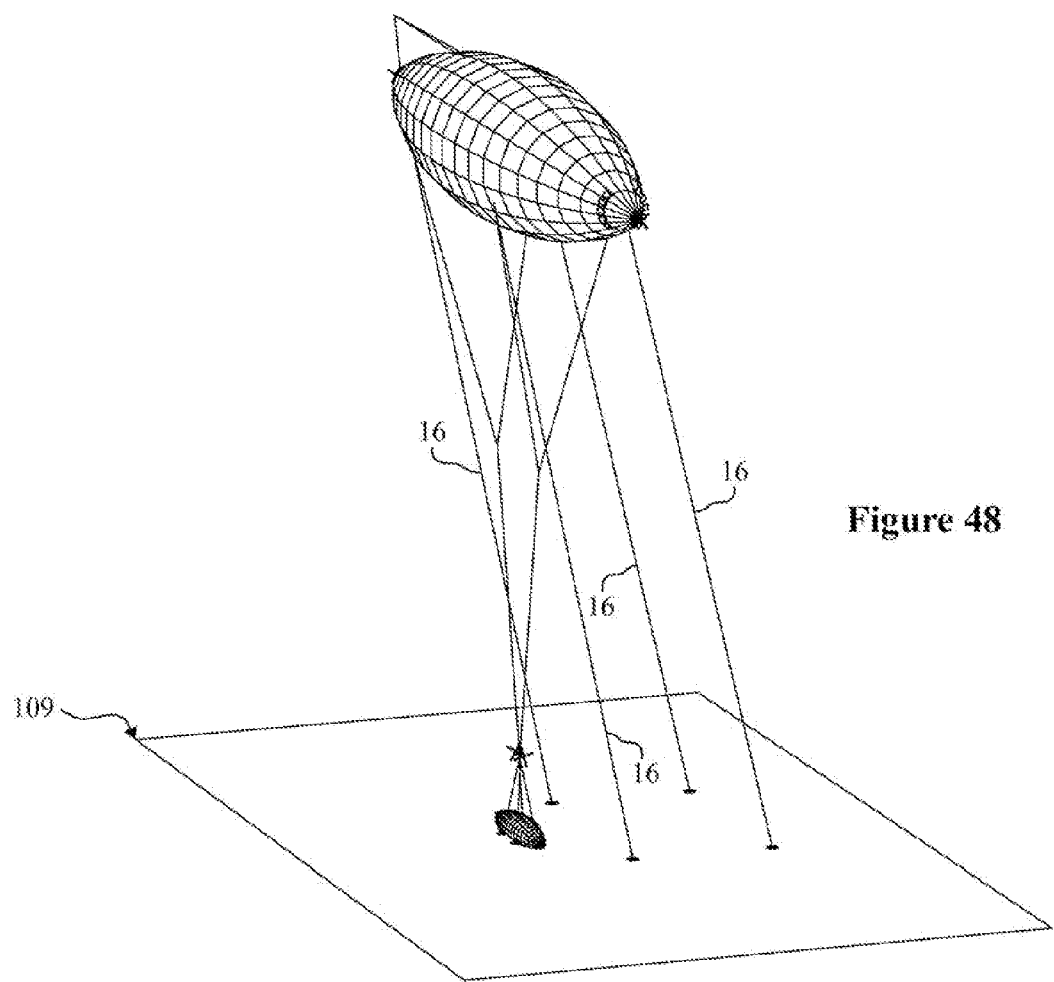
FIG. 48 shows Version 2 of the air vehicle with its envelope maintenance mooring lines lowered and attached to their ground winches at the site described in FIG. 46.
Figure 49:
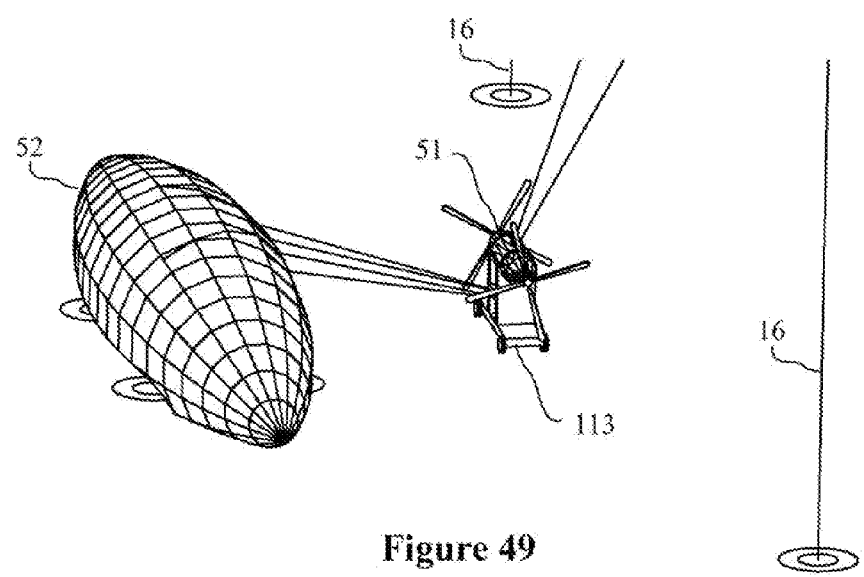
FIG. 49 shows how the gondola is lowered into a maintenance saddle as the envelope is winched to the ground at the site described in FIG. 46.

Once the FIG. 51 cargo carrier 52 is moored down securely, the four maintenance FIG. 48 mooring lines 16 are commanded to extend from small winches at the FIG. 3 load bridle 5 and FIG. 3 gondola cable 6 junctions. These mooring cables 16 are then attached to the four stronger ground mooring winches as depicted in FIG. 48.

The ground winches begin winching the main FIG. 1 envelope 1 to the ground. As it lowers, the FIG. 41 gondola 51 will also be lowered to the ground where it will settle into a maintenance FIG. 49 saddle 113.

Figure 50:
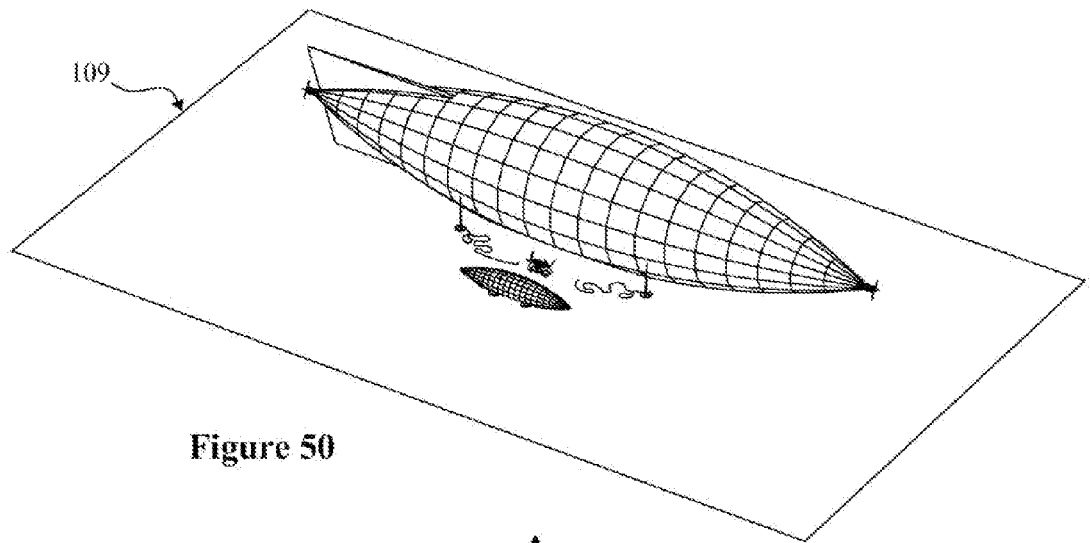
FIG. 50 shows Version 2 of the air vehicle fully secured in its maintenance position with the lower portion of the envelope squashed securely onto the ground.

FIG. 50 shows the 1075 foot long vehicle in its full maintenance position. At this point, short lines can replace the ground winches so the winches can be used elsewhere.

FIG. 51 shows a joystick controller 119 that is used to control any number of thrusters attached to the air vehicle.

When the joystick 120 is maneuvered in any of the indicated directions, the appropriate thrusters will act to add thruster force to the vehicle that would result in movement in the indicated direction if the vehicle were not being constrained. The amplitude of the added thruster force will be proportional to the maneuvering effort on the joystick 120. In the case of a variable pitch propeller thruster, first the pitch would be increased to its maximum and then the engine power would be increased to its maximum.

The word maneuvering is used to indicate either a displacement in the indicated direction or a force is applied in the indicated direction on the joystick 120. Any of the sensors in the joystick control 119 that sense this maneuvering effort on the joystick 120 could be either a force sensor, a displacement sensor or both a force and a displacement sensor.

Any of the maneuvering directions may be allowed to return to a neutral condition when the maneuvering effort is removed from it. In this case, the direction will also have a trim slide that can change the commanded signal at the no maneuvering effort output command position.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A system for controlling the lift of an airship for carrying a cargo and a supply of fuel comprising:
    a self supporting hull made of a flexible gas impermeable material;
    a first gas located in the hull at an internal pressure which is greater than the atmospheric pressure of the air on the outside of the hull;
    a bag filled with a lighter than air gas located within the hull and surrounded by the first gas;
    a heating means coupled to heat the first gas and the lighter than air gas;
    at least two airship thrusters coupled to urge the airship to travel to a selected destination using the fuel carried by the airship; and
    a gondola coupled to the self supporting hull;
    wherein the bag located within the hull and surrounded by the first gas has enough lighter than air gas in it at ambient temperature to lift all but the cargo and some of the fuel in the airship;
    wherein the first gas and lighter than air gas when heated provides increased buoyancy due to increased of both expansion of both heated gases to lift the airship with its fuel and cargo.

2. The system of claim 1 wherein the first gas is air.

3. The system of claim 2 wherein the air is heated by the furnace.

4. The system of claim 3 wherein the air is heated to a maximum temperature of about three hundred degrees F.

5. The system of claim 4 wherein air is heated directly by the furnace.

6. The system of claim 5 wherein the lighter than air gas is helium and is heated by the air surrounding the bag filled with helium.

7. The system of claim 5 wherein the helium is heated by hot gas from the furnace.

8. The system of claim 7 wherein the helium is heated by the hot gas from the furnace after the air is heated.

9. The system of claim 4 wherein the bag is large enough to allow the helium to expand between one and one-half and at least three times its ambient volume to a pressurized state.

10. The system of claim 9 wherein the helium in excess of the pressurized state is vented from the bag.

11. The system of claim 10 wherein the amount of expansion of the helium depends on the size or purpose of the airship.

12. The system of claim 11 wherein the inside surface of the hull is insulated to minimize heat loss.

13. The system of claim 12 wherein the volume the bag is between twenty percent and forty percent of the volume of the hull.

14. The system of claim 13 wherein the bag is made of a aluminum vacuum deposited on a thin flexible substrate.

15. The system of claim 14 wherein the substrate is a high melt temperature nylon.

16. The system of claim 15 wherein the gondola is hung below the hull on cables.

17. The system of claim 16 wherein air filled nose envelopes which are located at each end of the hull are pressurized with air at a pressure that is significantly higher than the pressure of the air in the hull.

18. The system of claim 17 wherein the two thrusters are located on the gondola, one thruster is located on the nose of the hull and one thruster is located on the tail of the hull.

19. The system of claim 18 wherein yaw control of the airship is obtained with movable rudder surfaces or by angling the thrust line of at least one of the thrusters.

* * * * *